(12) United States Patent
Ayanoğlu et al.

(10) Patent No.: US 12,432,080 B2
(45) Date of Patent: Sep. 30, 2025

(54) PERSISTENT DISPLAY OF PRIORITIZED PARTICIPANTS WITH SHARED CONTENT OF COMMUNICATION SESSIONS

(71) Applicant: MICROSOFT TECHNOLOGY LICENSING, LLC, Redmond, WA (US)

(72) Inventors: Defne Ayanoğlu, Prague (CZ); Nakul Madaan, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 17/986,867

(22) Filed: Nov. 14, 2022

(65) Prior Publication Data

US 2024/0163124 A1   May 16, 2024

(51) Int. Cl.
*H04L 12/18* (2006.01)
*G06F 3/0481* (2022.01)
(Continued)

(52) U.S. Cl.
CPC ........ *H04L 12/1822* (2013.01); *G06F 3/0481* (2013.01); *H04L 12/1827* (2013.01); *H04L 63/102* (2013.01); *H04L 65/4038* (2013.01); *H04L 67/306* (2013.01); *G06F 2203/04803* (2013.01)

(58) Field of Classification Search
CPC ............ H04L 12/1822; H04L 12/1827; H04L 63/102; H04L 65/4038; H04L 67/306; G06F 3/0481; G06F 2203/04803
See application file for complete search history.

(56) References Cited

U.S. PATENT DOCUMENTS 5,621,904 A  *  4/1997  Elliott ................... G06F 3/0481
                                                                     715/798
6,025,841 A  *  2/2000  Finkelstein .............. G09G 5/14
                                                                     715/803
(Continued)

OTHER PUBLICATIONS

International Search Report and Written Opinion received for PCT Application No. PCT/US23/033774, mailed on Feb. 1, 2024, 12 pages.
(Continued)

*Primary Examiner* — Justin R. Blaufeld
(74) *Attorney, Agent, or Firm* — Scott Y. Shigeta; Newport IP, LLC

(57) ABSTRACT

A system providing persistent display of prioritized participants with shared content. In a virtual meeting, a system can automatically and adaptively place a specific attendee's video based on the attendee's role and shared content having a specific data type. For example, a user can have accessibility settings that indicates a need for assistance. The system can automatically display a persistent display of a video stream of that user's assistant in a user interface. When content is shared, the system analyzes a rendering of the content to identify regions where the shared content is not displayed. The system then dynamically configures the user interface so that the persistent display of the video stream of the user's assistant is located in a region where the shared content is not displayed. Such features enable the user to have a consistent view of an assistant during the display of shared content.

20 Claims, 18 Drawing Sheets

(51) Int. Cl.
  *H04L 9/40* (2022.01)
  *H04L 65/4038* (2022.01)
  *H04L 67/306* (2022.01)

(56) References Cited

U.S. PATENT DOCUMENTS

| | | | |
|---|---|---|---|
| 6,377,282 B1 | 4/2002 | Champion | |
| 6,760,048 B1* | 7/2004 | Bates | G06F 3/0481 |
| | | | 715/781 |
| 7,546,536 B2* | 6/2009 | Imanishi | A63F 13/5372 |
| | | | 709/201 |
| 8,185,828 B2* | 5/2012 | Liu | G06Q 10/10 |
| | | | 715/753 |
| 8,330,793 B2 | 12/2012 | Robinson et al. | |
| 8,375,332 B2* | 2/2013 | Park | G06F 16/435 |
| | | | 715/838 |
| 9,800,931 B1 | 10/2017 | Tangeland et al. | |
| 10,863,227 B2* | 12/2020 | Faulkner | H04N 7/152 |
| 11,146,646 B2 | 10/2021 | Taine et al. | |
| 11,172,251 B1 | 11/2021 | Thomas et al. | |
| 2004/0064498 A1* | 4/2004 | Imanishi | H04L 12/1827 |
| | | | 709/201 |
| 2004/0261037 A1* | 12/2004 | Ording | G06F 3/0481 |
| | | | 715/788 |
| 2005/0099492 A1* | 5/2005 | Orr | H04N 7/147 |
| | | | 348/E7.083 |
| 2005/0278636 A1* | 12/2005 | Nomoto | G06T 1/00 |
| | | | 715/764 |
| 2006/0092269 A1* | 5/2006 | Baird | H04N 21/4622 |
| | | | 348/E7.083 |
| 2006/0125914 A1 | 6/2006 | Sahashi | |
| 2007/0174790 A1* | 7/2007 | Jing | G06F 3/0485 |
| | | | 715/838 |
| 2007/0174791 A1* | 7/2007 | Park | G06F 16/44 |
| | | | 345/169 |
| 2007/0279485 A1* | 12/2007 | Ohba | G06F 3/0481 |
| | | | 345/519 |
| 2008/0034085 A1* | 2/2008 | Chawla | H04L 67/535 |
| | | | 709/224 |
| 2009/0100455 A1* | 4/2009 | Frikker | G06F 16/436 |
| | | | 725/13 |
| 2010/0088623 A1* | 4/2010 | Ichino | G06F 3/0481 |
| | | | 715/802 |
| 2011/0271210 A1* | 11/2011 | Jones | H04L 67/306 |
| | | | 715/753 |
| 2012/0062688 A1* | 3/2012 | Shen | G06F 3/04886 |
| | | | 348/E7.083 |
| 2012/0072867 A1* | 3/2012 | Schlegel | G06F 3/0482 |
| | | | 715/808 |
| 2012/0311473 A1* | 12/2012 | Nolterieke | G06F 3/0481 |
| | | | 715/764 |
| 2014/0118781 A1* | 5/2014 | Kobayashi | H04N 1/00413 |
| | | | 358/1.15 |
| 2014/0184723 A1* | 7/2014 | Morrison | H04L 65/756 |
| | | | 348/14.07 |
| 2014/0198173 A1* | 7/2014 | Willig | H04N 7/155 |
| | | | 348/14.06 |
| 2014/0267560 A1* | 9/2014 | Bright-Thomas | H04N 19/88 |
| | | | 348/14.08 |
| 2015/0049162 A1* | 2/2015 | Kurupacheril | H04N 23/698 |
| | | | 348/14.08 |
| 2015/0103131 A1* | 4/2015 | Denoue | H04N 7/15 |
| | | | 348/14.03 |
| 2015/0293652 A1* | 10/2015 | Saito | G06F 3/0482 |
| | | | 715/211 |
| 2015/0295777 A1* | 10/2015 | Cholkar | H04L 41/22 |
| | | | 715/753 |
| 2015/0347399 A1* | 12/2015 | Aue | H04M 3/42 |
| | | | 704/2 |
| 2016/0098850 A1* | 4/2016 | Shintani | G06T 11/60 |
| | | | 345/634 |
| 2016/0231888 A1* | 8/2016 | Govindraj | G06F 3/04842 |
| 2016/0291747 A1* | 10/2016 | Fischer | G06F 3/1446 |
| 2016/0308920 A1* | 10/2016 | Brunsch | H04N 7/147 |
| 2016/0323333 A1* | 11/2016 | Aggarwal | H04N 7/152 |
| 2016/0349965 A1* | 12/2016 | Griffin | H04M 7/0027 |
| 2017/0038921 A1* | 2/2017 | Ishida | G06F 3/04817 |
| 2017/0169002 A1* | 6/2017 | Motoi | G06F 3/0484 |
| 2018/0011627 A1* | 1/2018 | Siracusano, Jr. | H04L 65/80 |
| 2018/0070008 A1* | 3/2018 | Tyagi | H04N 23/611 |
| 2018/0121214 A1* | 5/2018 | Faulkner | G06F 3/04883 |
| 2021/0335502 A1* | 10/2021 | Cordell | G06F 40/58 |
| 2022/0329638 A1* | 10/2022 | Miranda | G06F 3/04842 |

OTHER PUBLICATIONS

"Adjusting your video layout during a virtual meeting", Retrieved from: https://support.zoom.us/hc/en-us/articles/201362323-Adjusting-your-video-layout-during-a-virtual-meeting, Dec. 20, 2021, 8 Pages.

Jenkin, et al., "eyeView: Focus+Context Views for Large Group Video Conferences", In Journal of extended abstracts on Human factors in computing system, Apr. 2, 2005, pp. 1497-1500.

Miller, et al., "Semi-transparent Video Interfaces to Assist Deaf Persons in Meetings", In Proceedings of the 45th annual southeast regional conference, Mar. 23, 2007, pp. 501-506.

International preliminary report on patentability Received in European Patent Application No. PCT/US2023/033774, mailed on May 22, 2025, 08 pages.

* cited by examiner

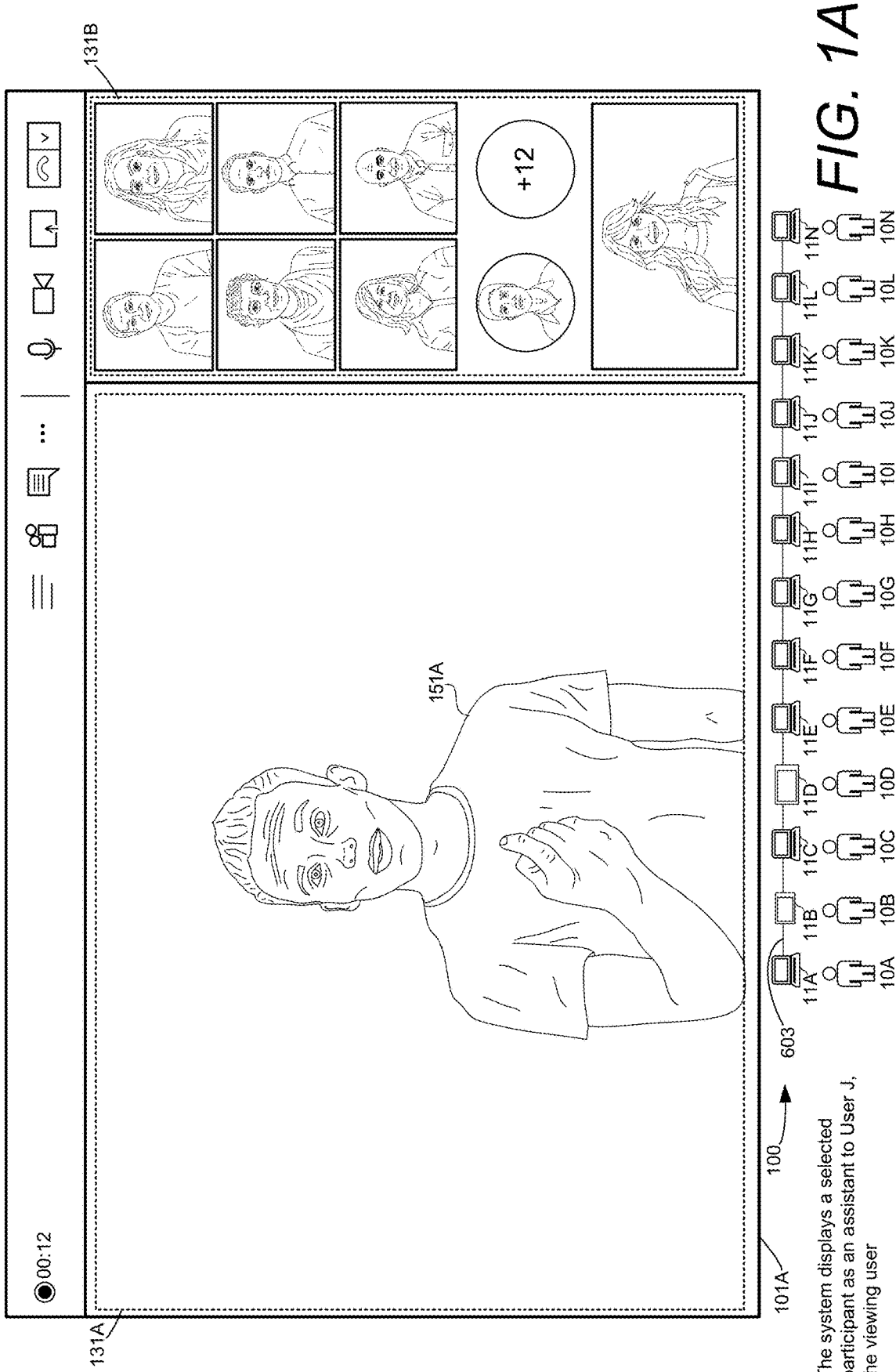

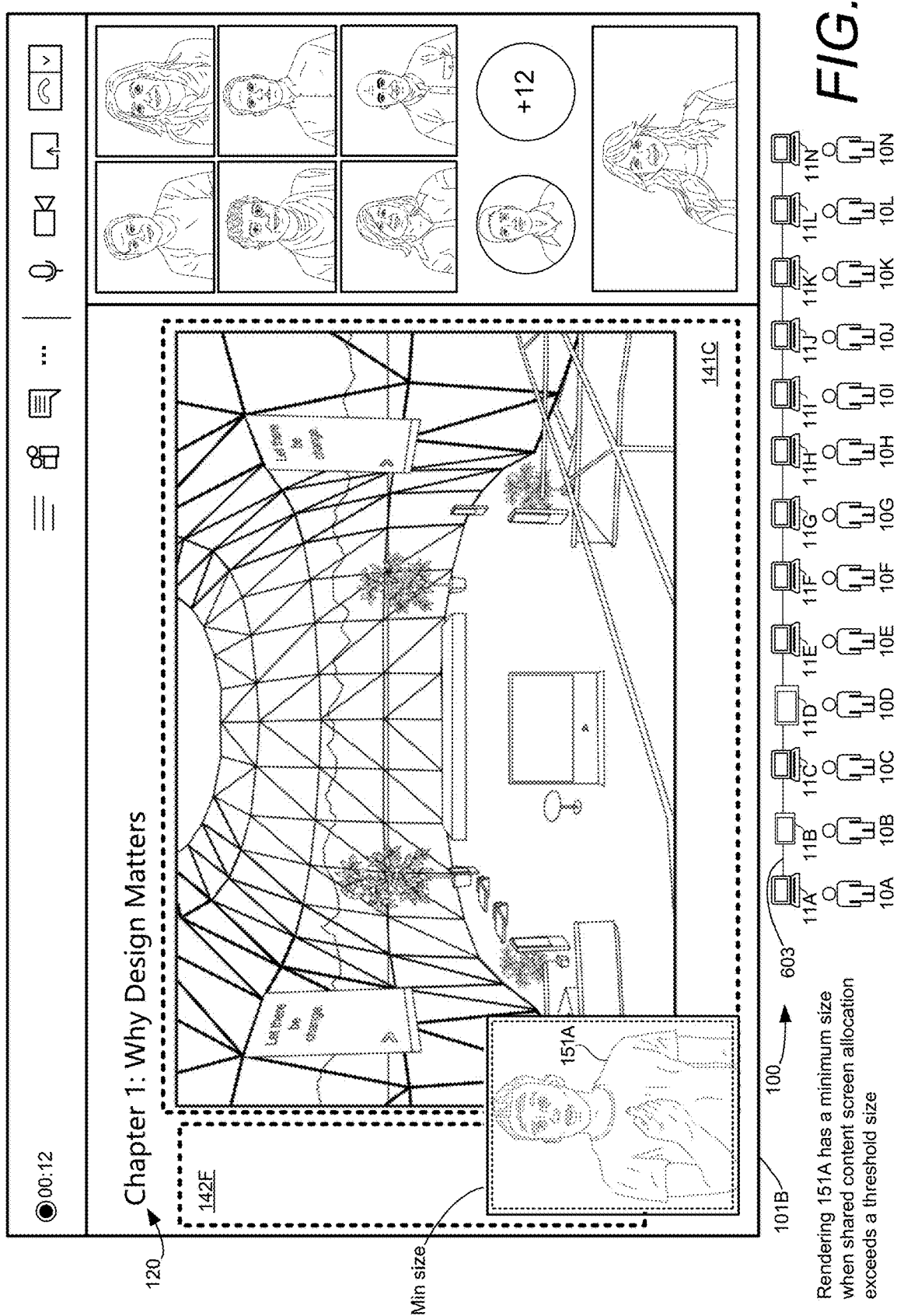

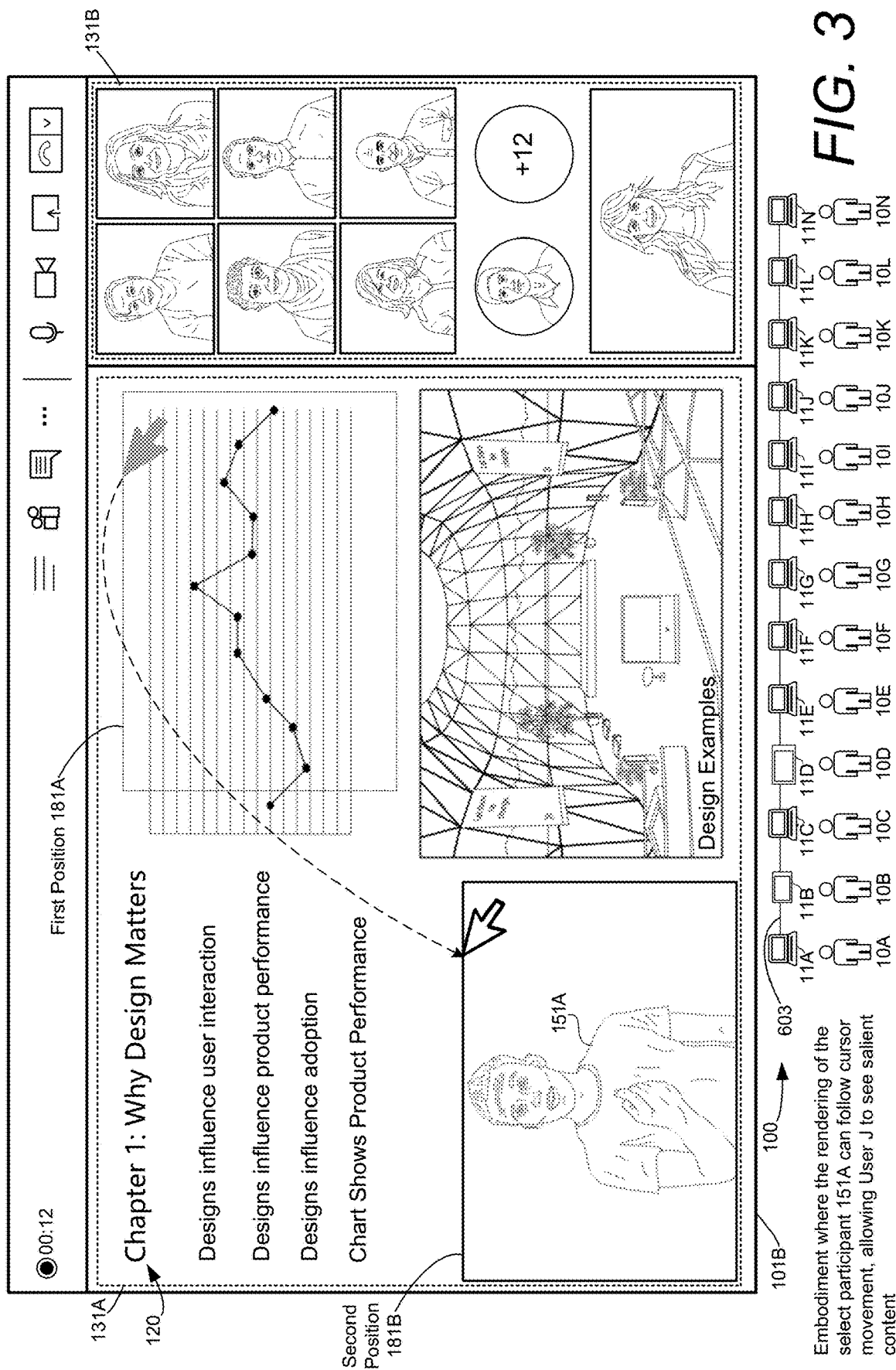

User B shares screen to other users.
Computer of User J shows select participant 151A, either attached to content or follows cursor When User B types the content 120 or moves a cursor 471, the rendering 151A of the assistant is positioned near the cursor so the rendering is near the most recent / most relevant content As User B types to add content 120, the rendering 151A of the assistant tracks the movement of the cursor so the rendering tracks most recent / most relevant content

FIG. 5A

Design Principles 2023

| Chapter 1 | Why Design Matters |
| Chapter 2 | Guidelines |
| Chapter 3 | What is New |

PERSISTENT DISPLAY OF PRIORITIZED PARTICIPANTS WITH SHARED CONTENT OF COMMUNICATION SESSIONS

BACKGROUND

There are a number of collaborative systems that allow users to communicate. For example, some systems allow people to collaborate by sharing content using video streams, shared files, chat messages, etc. Some systems also allow people to simultaneously edit documents while also enabling them to communicate using video and audio streams. Users can also establish a communication session at a specific time and share live video streams that can concurrently display people and content.

Although existing collaborative systems provide feature sets that allow people to conduct meetings via live video streams, some of these systems still have a number of drawbacks. For example, some existing systems do not have effective features that accommodate people who need language translators or sign language interpreters. In such instances, a meeting attendee can have an assistant, e.g., a translator or an interpreter, join a meeting. The assistant can then listen to the meeting, observe shared content and video streams, and provide an interpretation of their observations. For these tasks, it is important for the meeting attendee to have a clear view of their assistant. It can be difficult for the attendee to keep up with the flow of the meeting if the video rendering of a live video stream of the assistant moves or resizes during the meeting. Salient information may be missed if this occurs.

Some existing systems offer some features that can limit operations that re-position video streams. For example, some current solutions allow a meeting attendee to select a video stream, e.g., a video stream can be "pinned" into a location. Although this solution can help in some situations, there are many instances where these selected streams can be resized, moved, or removed altogether. In one illustrative example, a selected stream depicting a participant can be moved or resized when content is shared in a meeting. When a slide deck is shared during an on-line meeting, such content is often displayed on the main stage of a user interface. This arrangement oftentimes causes renderings of other users to be reduced to a small size or removed altogether, even if a video stream is pinned. This type of rearrangement, particularly of a video stream of a person's assistant, can cause a loss of production and engagement for the person that relies on their assistant, particularly in a situation where sign language interpretation or language translation is needed. These issues, and others, can lead to a loss of production and engagement, which ultimately leads to inefficient use of computing resources.

SUMMARY

The techniques disclosed herein enable a system to provide a persistent display of prioritized participants with shared content. In a virtual meeting, a system can automatically and adaptively place a specific attendee's video based on the attendee's role, such as "sign language interpreter," according to a shared content type and a user setting. The system can dynamically move and re-size the display of the specific attendee's video to mitigate instances where a rendering of the specific attendee's video is blocked or visually compromised by a display of shared content. For example, a first user can have a user setting that indicates a need for assistance, such as "hard-of-hearing" in an accessibility setting. When that first user is in a meeting, the system can automatically display a persistent display of a video stream of that user's assistant in a designated region of a user interface. When content is shared during that meeting, the system determines if the content type meets one or more criteria. If the content type meets one or more criteria, the system analyzes the user interface to identify a first set of regions where the shared content is displayed and a second set of regions where the shared content is not displayed. The system then dynamically configures the user interface so that the persistent display of the video stream of the user's assistant is located in the second set of regions where the shared content is not displayed. Such features enable the user to have a consistent view of an assistant during the display of shared content.

In some configurations, the detection of shared content having a particular data type can cause a system to transition from a normal operating mode to a content tracking mode. In the normal operating mode, the system can automatically display a video stream of an assistant having a role that corresponds to a prerequisite of a meeting participant. The video stream of the assistant can be in a static location, e.g., in a primary stage of a user interface, while the system is in the normal operating mode. When a user shares content with other users, the system invokes a content tracking mode where the system continually analyzes a rendering of shared content that meets one or more criteria and determines regions within the rendering where content is displayed and other regions where content is not displayed. The system then displays the video stream of the assistant in the regions within the user interface where content is not displayed. This helps mitigate overlap between a video stream of the assistant and a display of shared content while also keeping the video stream of the assistant at a size that is sufficient for allowing a user to interpret their assistant's gestures.

The shared content can meet criteria for invoking the content tracking mode when a user shares content having a particular data type and/or when shared content is displayed in a particular area of a user interface. For example, the detection of shared content can invoke the content tracking mode when a user shares content having a particular data type, e.g., a video, a word document, or a slide deck. In such examples, the system may not invoke the content tracking mode if a user shares other types of content that do not meet one or more criteria, e.g., a chat message, a contact card, or a still image displayed within a chat thread. In another example, the detection of shared content can invoke the content tracking mode when content is shared in a predetermined area, e.g., a primary stage of a user interface. Such embodiments may not invoke the content tracking mode if content is shared in other areas of a user interface, e.g., within a chat thread, a secondary stage, etc.

The criteria for invoking the content tracking mode can also include the detection of a combination of events. For example, the detection of shared content can invoke the content tracking mode when a user shares content having a particular data type, e.g., a video, a word document, or a slide deck, that is displayed within a primary stage of a user interface. In such embodiments, other types of data, e.g., chat messages, contact cards, or still images shared within a chat thread or a secondary stage would not invoke the content tracking mode.

The techniques disclosed herein provide a number of technical benefits. In one example, the techniques disclosed herein provide reliable accessibility features. If a participant of a meeting is in need of a sign language interpreter, the system can maintain the display of their sign language interpreter throughout a number of interruptions. This has a number of benefits over traditional pinning. For example, certain events, e.g., detection of shared content, do not disrupt the display of the video stream of the language interpreter. This allows the user to view an interpretation of the content of a meeting with an increased reliability over some existing systems. In addition, the user does not have to go through the process of selecting the language interpreter to be pinned during a meeting. The automatic selection and persistent display of an assistant eliminates the need for a meeting participant to manually identify another user as an assistant and provide input to pin a display of that other user. This can save a number of computing resources in that a meeting participant does not interrupt a meeting or miss any content each time they join a meeting.

By providing participant prioritization across communication sessions and for providing persistent displays of the prioritized participant during the display of content, systems can promote user engagement. By promoting user engagement and avoiding user fatigue, particularly in a communication system, users can more effectively exchange information. This helps mitigate occurrences where shared content is missed or overlooked when users become distracted or disengaged. Promotion of user engagement and avoidance of user fatigue can reduce occurrences where users need to prolong meetings or re-send missed information. More effective communication of shared content can also help avoid the need for external systems, such as mobile phones for texting and other messaging platforms. This can help reduce the duplicative use of network, processor, memory, or other computing resources. The disclosed techniques also provide improved human interaction with a system using automation of user settings. This enables a system to be utilized in more effective ways by reducing the display of unwanted menus, reducing erroneously selected objects, or reducing erroneously triggered operations.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A shows a persistent display of a video of an assistant that is automatically configured in a designated region of a user interface in response to determining that a role of the assistant corresponds to a prerequisite of a user associated with the user interface.

FIG. 2 shows an example of how the video of an assistant is modified to accommodate a large-scale or full-screen display of shared content.

FIG. 3 shows an example of how the video of an assistant is moved using an input device during a content share between users.

FIG. 5A shows an example of regions that can be used in the analysis of shared content to determine regions for displaying a video of an assistant.

FIG. 5C shows how select regions can be used to determine an area for displaying a video of an assistant.

DETAILED DESCRIPTION

Figure 1B:
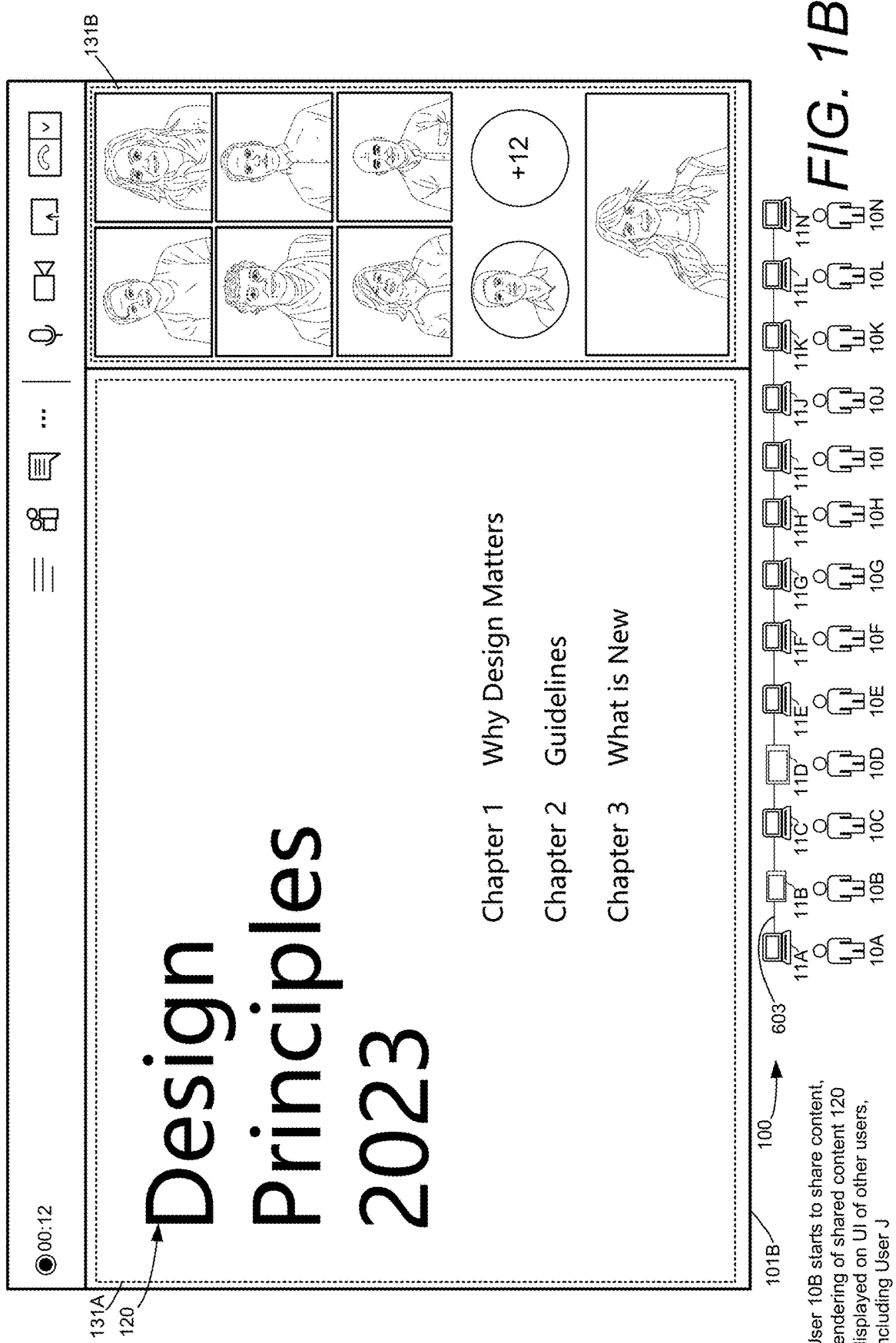
FIG. 1B shows a user interface where content is shared between users of a communication session.
Figure 1C:
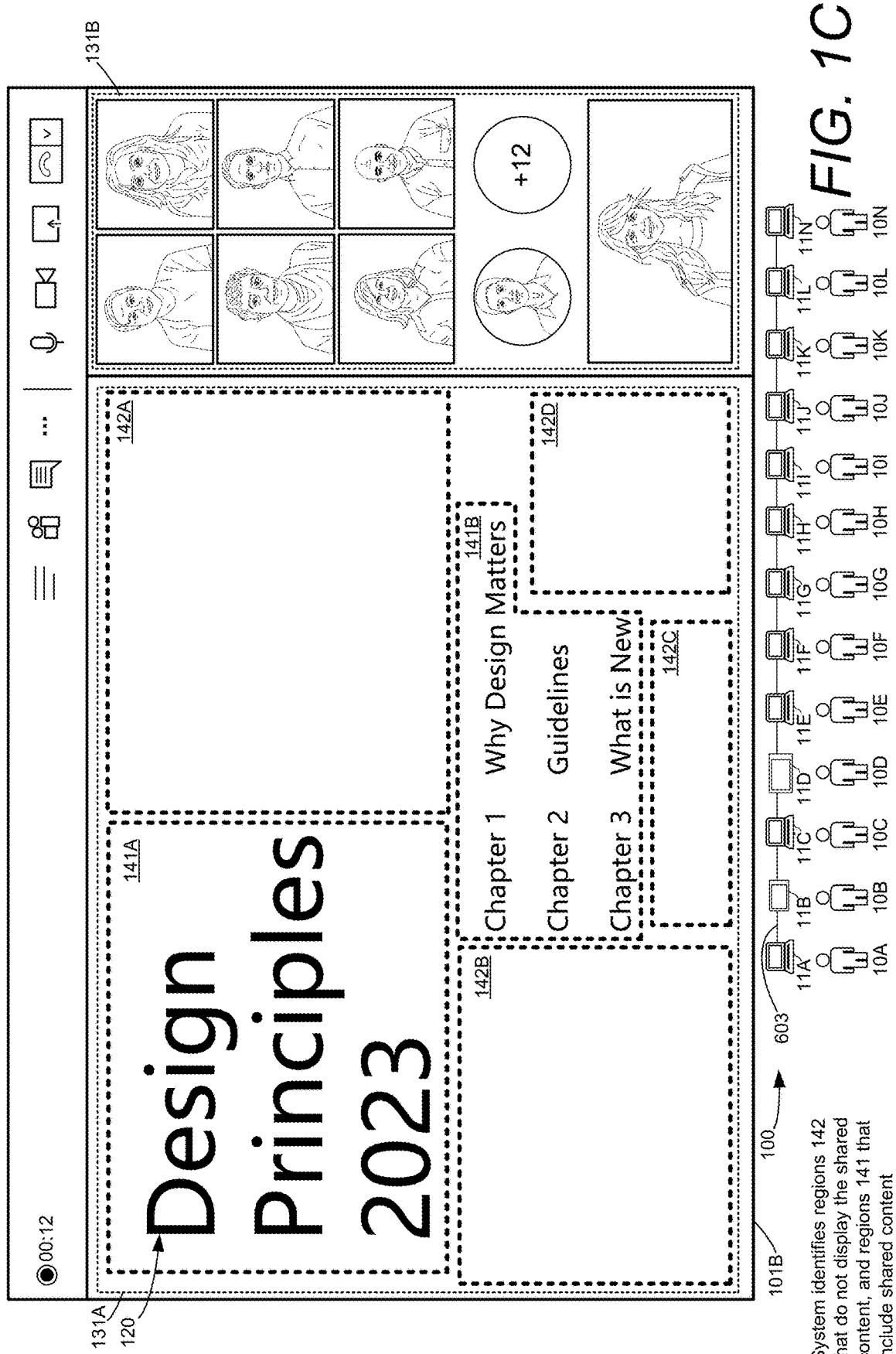
FIG. 1C shows an example of regions of a user interface, where a first set of identified regions is determined to include shared content, and a second set of identified regions is determined to not include shared content.
Figure 1D:
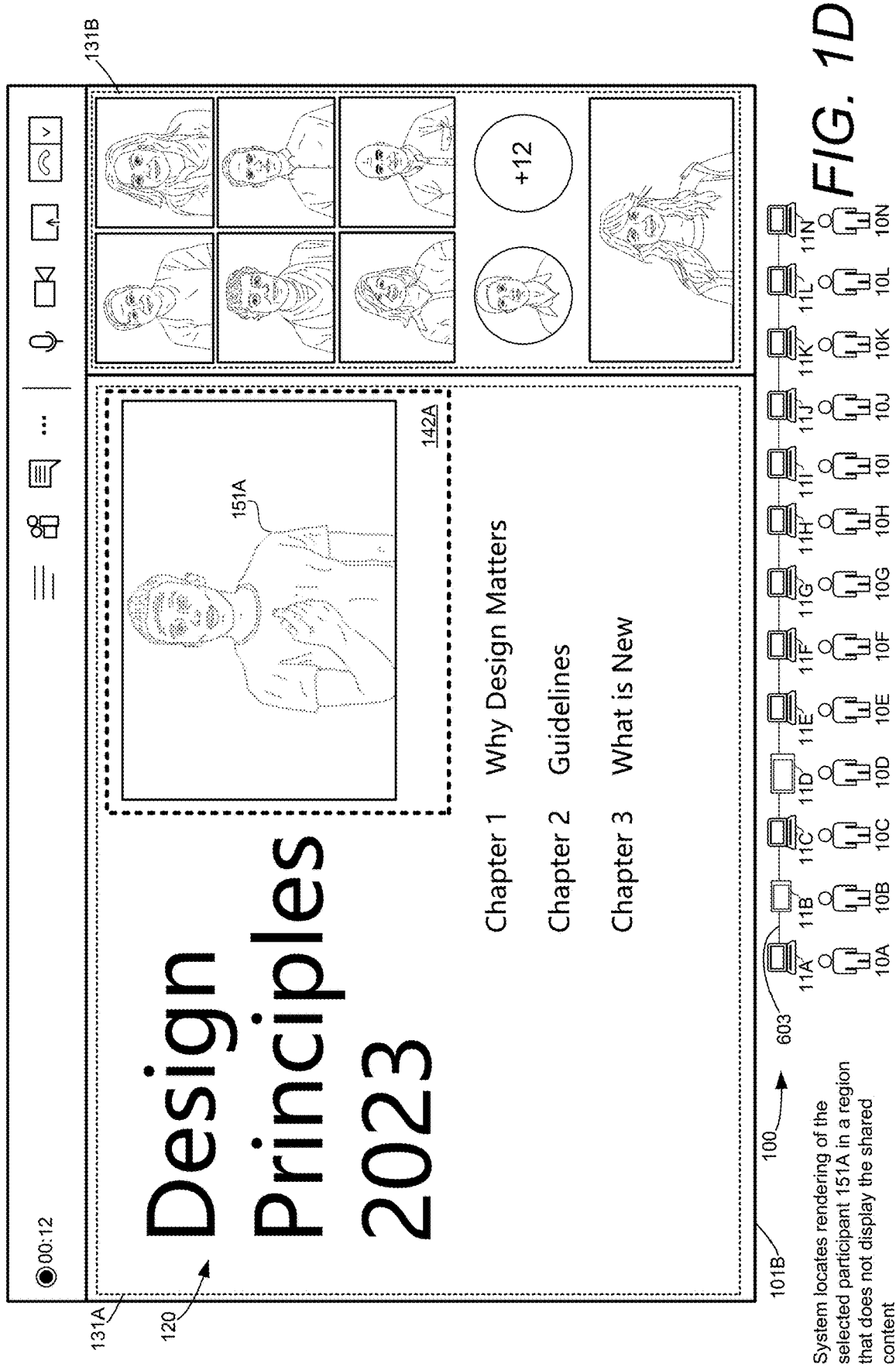
FIG. 1D shows a video of an assistant that is persistently displayed in one of a second set of identified regions that is determined to not include shared content.
Figure 1E:
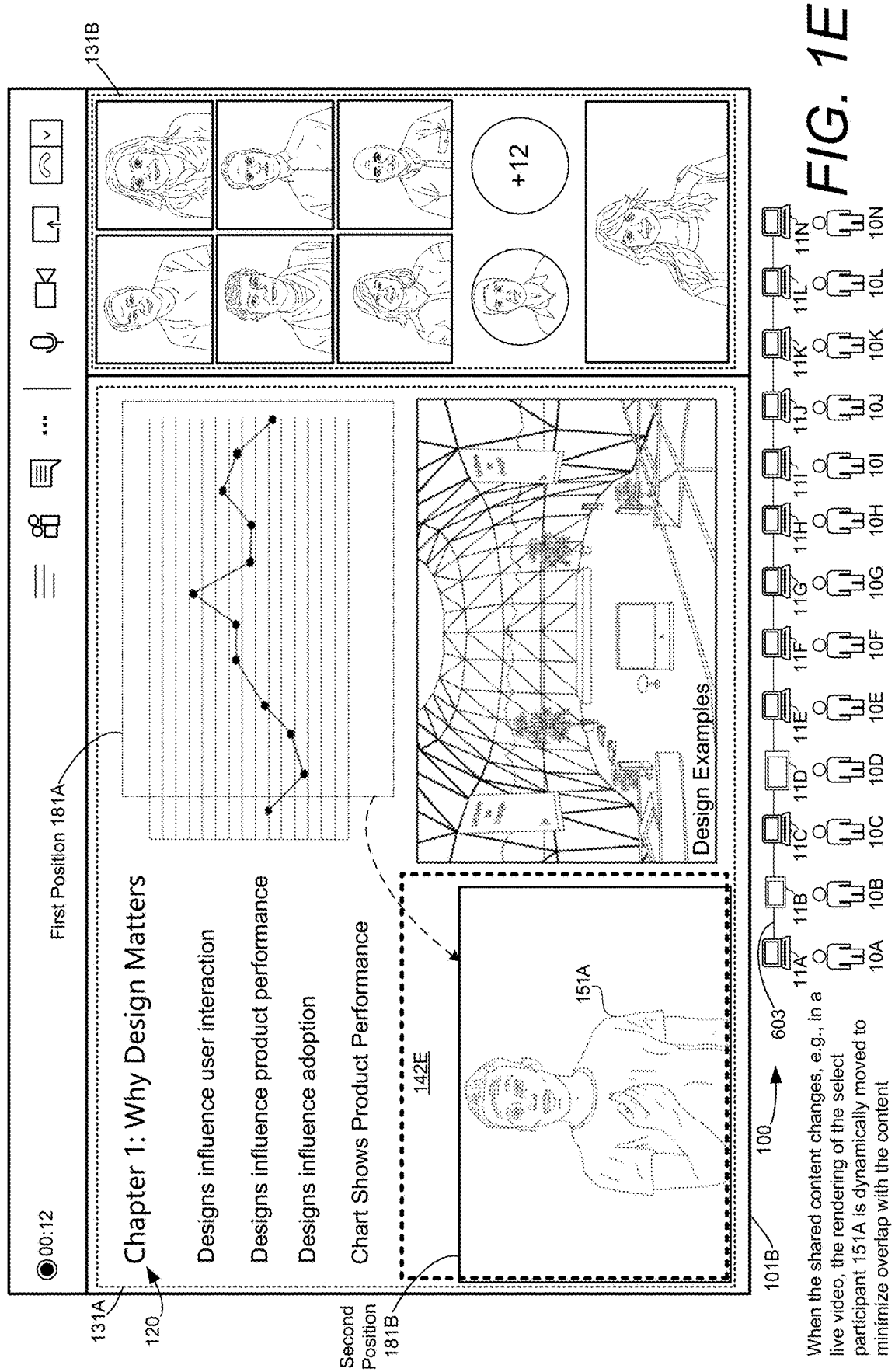
FIG. 1E shows a video of an assistant that is moved as shared content is updated.

FIGS. 1A through 1E illustrate aspects of a system 100 that provides a persistent display of prioritized participants with shared content during a communication session. The system automatically displays a select participant, such as a sign language interpreter. The system can also dynamically move and re-size the display of the select participant to mitigate instances where a rendering of the select participant is blocked or visually compromised by a display of shared content. As shown in FIG. 1A, the system can start in a normal operating mode where a first user interface includes a rendering of the video stream of the select participant 10A, such a sign language interpreter, who is displayed in a primary region. In normal operating mode, the display of the select participant does not move according to the display of shared content. When content is shared by another user and displayed in the primary region of the user interface, as shown in FIG. 1B, the system invokes a content tracking mode. FIG. 1C shows an example of how the shared content can be analyzed during content tracking mode to identify regions of that include the shared content and other regions that do not include the shared content. FIG. 1D shows how the system can display the video of select participant during the content tracking mode within a region that does not include the shared content, and FIG. 1E shows how the system can move the video of select participant as the content is updated.

A communication session can be in the form of an on-line meeting, a broadcast or any other gathering that includes a start time and an end time. As shown in FIG. 1A, the communication session can be managed by a system 100 comprising a number of computers 11 each corresponding to individual users 10. For illustrative purposes, a first user 10A, Mike Taylor, is associated with a first computer 11A, a second user 10B, Traci Isaac, is associated with a second computer 11B, a third user 10C, Doug Wright, is associated with a third computer 11C, a fourth user 10D, MJ Price, is associated with a fourth computer 11D, a fifth user 10E, Kat Martin, is associated with a fifth computer 11E, a sixth user 10F, Miguel Jones, is associated with a sixth computer 11F, a seventh user 10G, Krystal McKinney, is associated with a seventh computer 11G, an eighth user 10H, Jessica Kline, is associated with an eighth computer 11H, a ninth user 10I, Monica Larsson, is associated with a ninth computer 11I, a Tenth User 10J, Charlotte Davis, is associated with a tenth computer 11J, an eleventh user 10K, Annika Andersson, is associated with an eleventh computer 11K, and a twelfth user 10L, Isla Scoggins, is associated with a twelfth computer 11L. These users can also be respectively referred to as "User A," User B," etc.

Each user can be displayed in a user interface as two-dimensional 2D images or each user can be displayed in a user interface as a three-dimensional representation, e.g., an avatar. The 3D representation may be a static model or a dynamic model that is animated in real-time responsive to a user input. Although this example illustrates a user interface with users displayed as 2D images, it can be appreciated that the techniques disclosed herein can apply to other forms of representations, videos or other types of renderings. The computers 11 can be in the form of desktop computers, head-mounted display units, tablets, mobile phones, etc. The system can generate a user interface showing aspects of the communication session to each of the users. In the example of FIG. 1A, a first user interface arrangement 101A can include a number of renderings of one or more users 10. The renderings can include renderings of two-dimensional (2D) images, which can include a picture or live video feed of a person.

In this example, the user interface is rendered on a display device of the tenth computer 11J, which is associated with the Tenth User 10J, Charlotte Davis. Charlotte is referred to herein as the "viewer" or "viewing user" of the user interface displayed on the tenth computer 11J. The first user interface arrangement 101A comprises a first region 131A, also referred to herein as a designated region 131A or a primary stage 131A. The first user interface arrangement 101A also includes a second region 131B, also referred to herein as a secondary region 131B or a secondary stage 131B. The first user interface arrangement 101A also comprises another rendering of a video stream 151J showing a self-view of the Tenth User 10J. This video stream 151J can be displayed in the second region 131B and is restricted from being displayed in the first region 131A. The first region is only reserved for video streams of users having roles that correspond to prerequisites of the viewer. The first region is also reserved for the display of content shared by the users having a predetermined data type, e.g., recorded videos, slide deck content, word document, spreadsheet content, etc.

When the Tenth User 10J (User J) joins the communication session, the system automatically accesses the preferences of User J. The preferences can indicate that User J is in need of assistance, e.g., a prerequisite that User J has indicated they are hard-of-hearing and prefers to attend a meeting with an assistant. In response to that indication, the system can cause a display of a rendering of a video stream 151A of a select user, e.g., the First User 10A (User A), within the designated region 131A of the user interface 101A. As described in more detail below with respect to FIG. 5, User A can be selected for display in the primary stage 131A in response to determining that User A has a role, e.g., a sign language interpreter, that corresponds to the prerequisite of User J, e.g., an indication that User J is hard-of-hearing.

The system is configured to persistently display an assistant in a designated region even when the communication session transitions through different types of operating modes, such as a transition between a normal operating mode where the system only shares video feeds of individual users to a second operating mode where the system shares a rendering of shared content having a particular content type with video feeds of individual users. As shown in FIG. 1A, the system can be in normal operating mode where the video rendering 151A of the assistant is positioned within the primary stage 131A of a first user interface arrangement 101A. Normal operating mode can be invoked when a user is not sharing content to be displayed on the computing devices of other attendees.

The system can then receive an input to invoke a transition from the normal operating mode to the content tracking mode. The input can be a user input identifying shared content or a system operation where content is automatically displayed on one or more client devices 11 of participants 10 of the communication session 603. FIG. 1B shows an example rendering of content that is shared between participants 10 of the communication session.

In response to the input invoking the transition from the normal operating mode to the content tracking mode, the system can analyze the rendering of the shared content 120 to identify a first set of regions 141 that include a threshold level of the shared content 120 and a second set of regions 142 that do not include the threshold level of shared content 120. For illustrative purposes, the first set of regions 141 of that include the threshold level of the shared content 120 are also referred to herein as "unavailable regions 141," and the second set of regions 142 that do not include the threshold level of the shared content 120 are also referred to herein as "available regions 142." As described in more detail below, the analysis of the shared content for identifying the regions can be performed using a number of suitable techniques.

In some configurations, the system may only invoke the content tracking mode if the shared content has a particular content type. For example, the system may only transition to the content tracking mode if the input identifies shared content that has a data type from a first class of data types, e.g., a slide deck, word processing document, spreadsheet, video, or image. Thus, the system may not transition to the content tracking mode if other types of content are shared, chat messages, audio streams, etc.

After the system identifies the available and unavailable regions, the system can position the video rendering of the assistant 10A in one or more available regions 142A. As shown in FIG. 1D, the system can cause a display of a second user interface arrangement 101B while in the system is in the content tracking mode. The second user interface arrangement 101B can include the rendering 151A of the video stream of the select participant 10A positioned within one or more of the available regions, such as region 142A. The rendering 151A of the video stream of the select participant 10A is positioned within the available region 142A, such that the rendering 151A of the select participant is concurrently displayed with the shared content 120 that is positioned within the first set of regions 141. The arrangement enables User J to have a consistent view of an assistant during the display of shared content. This arrangement helps mitigate overlap between the video stream of the assistant and the display of shared content while also keeping the video stream of the assistant at a size that is sufficient for allowing a user to interpret their assistant's gestures.

The analysis of the shared content can be performed each time the shared content is updated. For example, if shared content involves a video, the analysis may be performed for each frame or each time objects depicted in a video change. If the shared content involves a slide deck, or a new section of a document, the analysis of the displayed content may be performed each time an input is received to select a new slide or a new section of the document. For example, as the content transitions from the first slide of FIG. 1B, to the second slide of FIG. 1E, the system analyzes the shared content to of the second slide identify a new available region 142E that does not include a threshold level of content, and the system moves the video rendering 151A from the first position 181A to the second position 181B within the new available region 142E.

In some configurations, the rendering 151A of the assistant 10A can be reduced in size when a predetermined set of conditions are detected. In one illustrative example, if a system determines that a rendering of shared content does not contain any available regions having a predetermined size to accommodate a rendering 151A of the assistant 10A, the system can reduce the rendering 151A of the assistant 10A. As shown in FIG. 2, the rendering 151A can be reduced to a minimum size threshold. A minimum size threshold is used to allow the rendering to be at a viewable size such that the viewing user can readily view the gestures performed by the assistant.

When the rendering is reduced in size, the position of the rendering can be placed near a border of a rendering of the shared content to minimize the occurrences where the rendering 151A covers salient content near the center of the rendering of the shared content. This position can also include an analysis where keywords are detected in the rendering of the shared content. If one or more keywords are detected from a list of predetermined keywords, the rendering 151A of the assistant is positioned to a region that does not include a display of one of the predetermined keywords or the display of any other priority content. Priority content, such as predetermined keywords, images of predetermined people or objects, can be designated by any one of the participants via a preference file, a chat message, or any other form of communication generated by a user. Thus, the system may position a rendering 151A of an assistant to not overlap with a first region containing priority content, and position the rendering 151A of the assistant to overlap with a second region that does not contain priority content.

In one example, during the analysis of the rendering of the shared content, the system can determine that one or more dimensions of the regions of set of available regions 142 is less than a threshold dimension. In response to determining that one or more dimensions of the regions of set of available regions 142 is less than a threshold dimension, the system can reduce at least one dimension of the rendering 151A of the video stream of the select participant 10A to a threshold minimum size while the system is in content tracking mode.

In some embodiments, the threshold minimum size may be based on the device type or a screen size. For instance, for a desktop computer or a device having a twenty two inch monitor, the threshold minimum size may be a predetermined percentage of the screen, e.g., 50%, of one dimension of the screen. However, for a tablet or mobile device or a device having a five inch screen, the threshold minimum size may be a greater predetermined percentage of the screen, e.g., 90%, of one dimension of the screen. Although screen dimensions are used in this example other units of measure can be utilized. For instance, if a device screen has less than a threshold number of pixels, e.g., two million, the system may use a first threshold minimum size; and if a device screen has more than the threshold number of pixels, the system may use a second threshold minimum size for the rendering of the assistant 10A, where in this example, the first threshold minimum size is greater than the second threshold minimum size. The threshold minimum sizes can be applied to a number of pixels or one or more dimensions of the rendering. This allows a system to use a higher percentage of the screen for a rendering of the assistant 10A for smaller screen devices. The threshold minimum size can apply to any rendering 151A of an assistant 10A, or a user having a role that corresponds to a prerequisite of a viewing user.

In some configurations, as shown in FIG. 3, the system may enable a user to move the rendering 151A of the assistant using an input device. This input control can be enabled during the content tracking mode, e.g., when shared content is displayed. This may include receiving, at the system, a control input from a computing device 11J in communication of a display screen showing the second user interface arrangement 101B. The control input includes coordinates within the second user interface arrangement 101B, and the control input can be received from a pointing device such as a mouse, trackball, touch pad, touch screen, eye tracking device, etc.

The system can then move the rendering 151A of the video stream of the select participant 10A according to the coordinates indicated by the control input. The control input is configured to control the movement of the rendering 151A of the video stream of the select participant 10A during the content tracking mode. The control input is restricted from controlling the movement of the rendering 151A of the video stream of the select participant 10A during the normal operating mode.

Figure 4A:
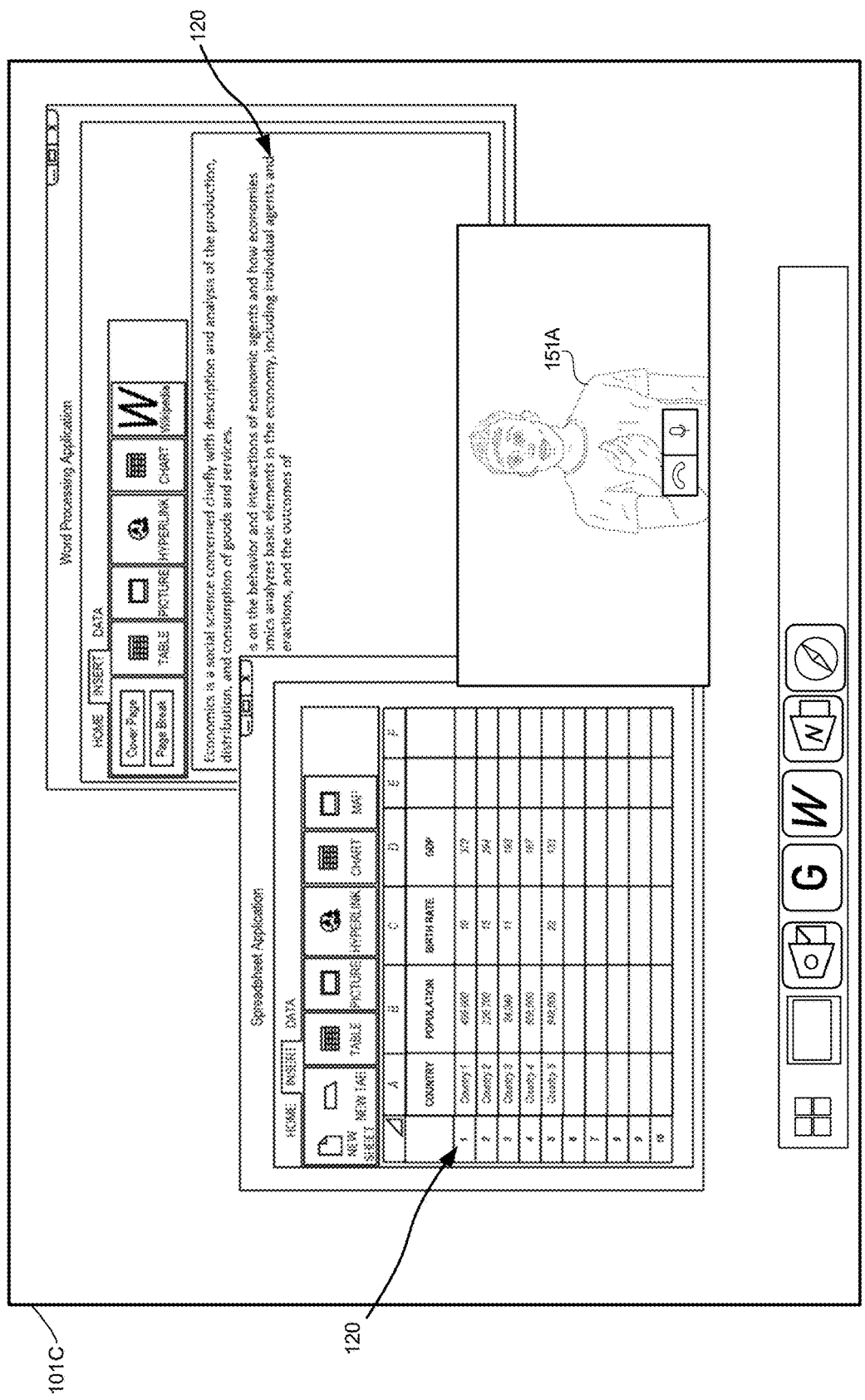
FIG. 4A shows a user interface arrangement where the communication application is minimized and the communication application displays a monitor with shared content on a screen share of a desktop.
Figure 4B:
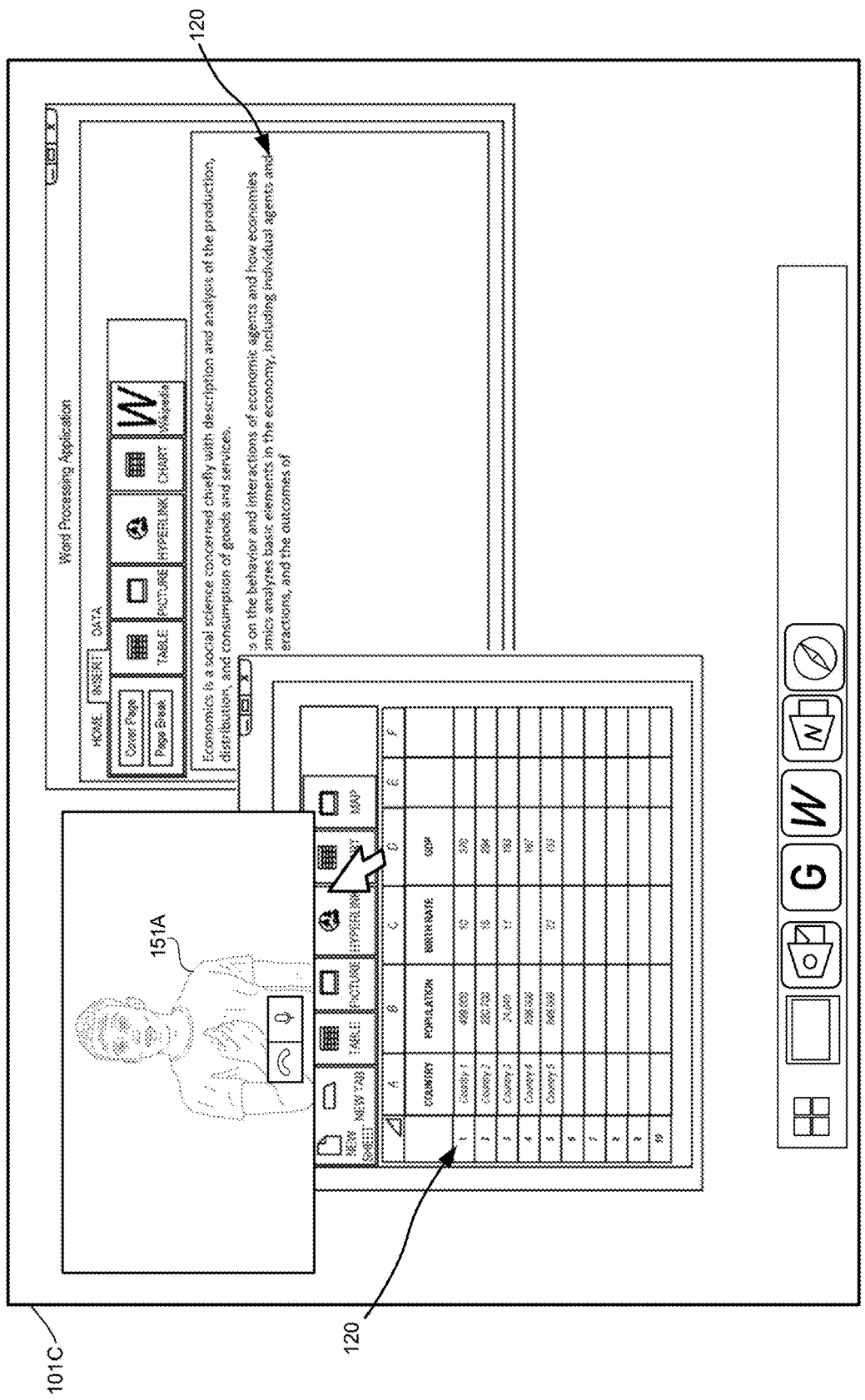
FIG. 4B shows a user interface arrangement where the communication application is minimized and the communication application displays monitor with shared content on a screen share of a desktop, where the monitor is moved by an input of a presenter interacting with the desktop of the computer of the presenter.
Figure 4C:
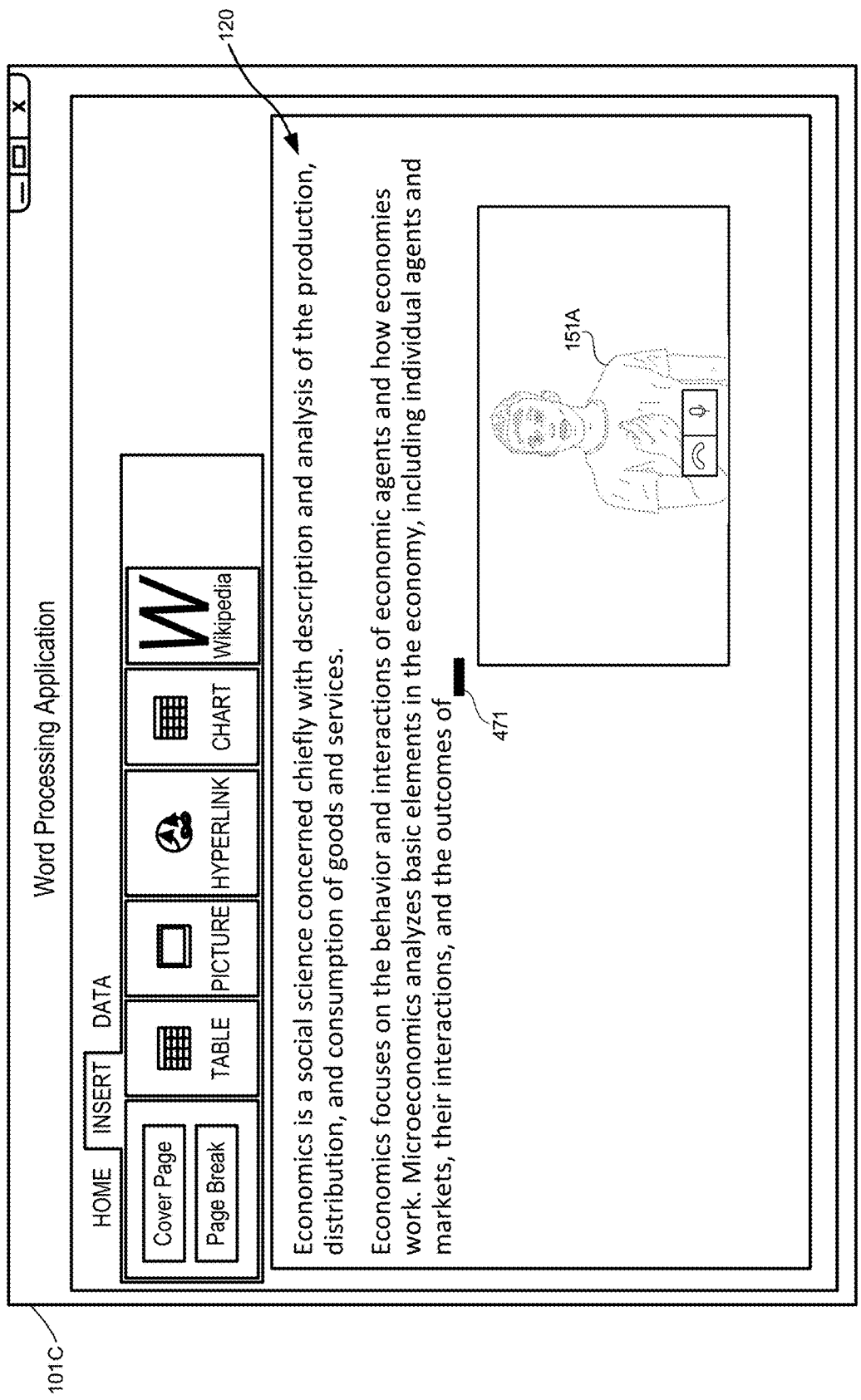
FIG. 4C shows a user interface arrangement where the communication application is minimized, and the communication application displays monitor with shared content on a word processing application.

The rendering 151A of the assistant can persist through transitions of system operating states between multiple levels of an operating system. For illustrative purposes, the rendering 151A of the assistant can also be referred to herein as a "monitor 151A." The monitor 151A can be displayed during the use of a communication application such as those shown in FIG. 1A through FIG. 3. The monitor can also be displayed when the communication application is minimized. The system can be configured to persistently display the monitor 151A while the system displays a user interface for the communication application, while the system displays a desktop of an operating system without the user interface for the communication program, and while the system displays a user interface of another application, such as a word processing application or slide deck application, without the user interface for the communication application. FIGS. 4A-4C show examples of these operating states.

FIG. 4A shows another user interface arrangement 101C, where the communication application is minimized, e.g., the communication application is not displayed and the computer displays another application or an operating system desktop. As shown in FIG. 4A, when User B is sharing a view of their computer desktop, the computers of other users, including the computer of User J. However, unique to User J, and other users having prerequisites that correspond to a role of User A, in addition to the display of the computer desktop of User B, the system displays a monitor of User 10A on the rendering of the desktop. The size and position of the monitor 151A is determined by the techniques disclosed herein with respect to renderings 151A of the assistant. The monitor can be displayed in regions that do not contain a threshold level of content or priority content.

User J can provide an input from a corresponding computer 11J to move the monitor 151A. In such an input, since User J is not the person sharing the content, that input only moves the monitor for that one computer of User J, e.g., an input at computer 11J only moves the monitor displayed at computer 11J, even if other users have a display of the monitor 151A showing the same assistant.

However, when the user sharing the content, e.g., User B is sharing their desktop, provides an input moving a cursor, that input can move a monitor for all other users viewing the desktop with a display of the monitor 151A showing an assistant. Thus, an input provided by User B to move a cursor or to edit content can move the monitor 151A displayed on the screen of computer 11J of User J. That way, when the presenter (User B) is selecting or editing content or selecting different applications, the viewing users (User J) who have displayed assistants, are not required to provide an input to have their monitor 151A track the activity of the presenter. The monitor tracks the salient content shared by the presenter based on the presenter's actions. This feature is shown in FIG. 4B, where the presenter, User B, moves a cursor and the monitor 151A displayed on the screen of User J tracks the cursor movement.

Figure 4D:
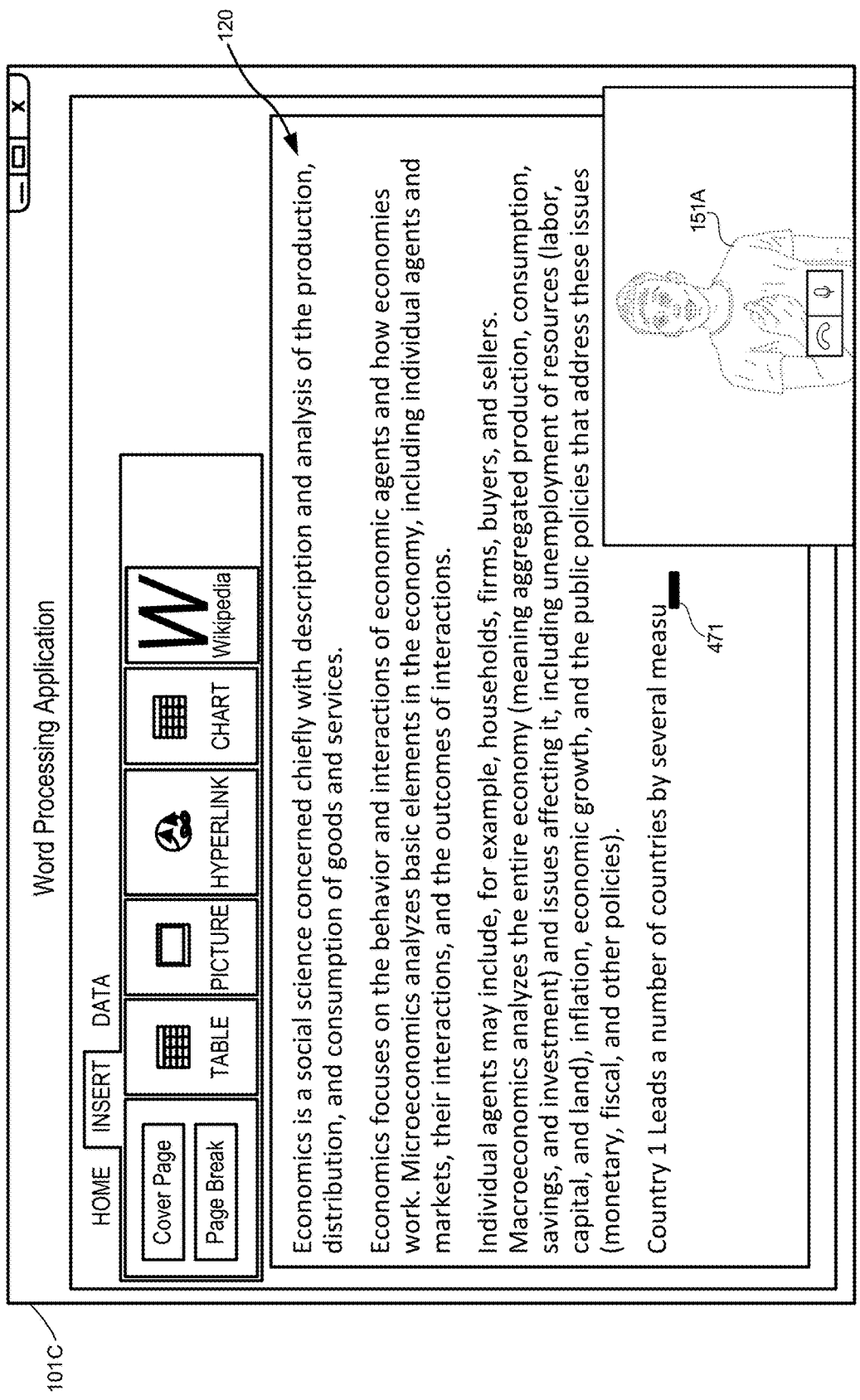
FIG. 4D shows a user interface arrangement where the communication application is minimized and the communication application displays monitor with shared content on a word processing application, where the monitor is moved by an input of a presenter interacting with the word processing application operating on the computer of the presenter.

FIG. 4C shows another example of a monitor 151A that is displayed in a user interface arrangement 101C where the communication application interface is minimized. In this case, the presenter, User B, has selected a word document displayed in a word processing application to be displayed on the screen of other users. The computer 11J of User J displays a monitor 151A showing the assistant of User J. In this example, the cursor 471 is in the form of a text input cursor. Thus, as shown in FIG. 4C and FIG. 4D, as the presenter, User B, types content 120 on the word processing application, the system automatically moves the monitor 151A that is persistently displayed on the computing device of User J to track the movement of the text input cursor. This tracking feature allows User J to view relevant content or the newest content based on what is being added or highlighted by a cursor. Thus, in any operating mode, a monitor showing a first user, User A, that is persistently displayed with shared content to a second user, User J, having a prerequisite that corresponds to a role of the first user is automatically moved by the system based on an input provided by a third user, User B, sharing their screen displaying an operating system desktop.

This feature can be beneficial for other types of applications that show content in specific locations. For instance, consider a scenario where a user is sharing a screen with a developer studio and other users of a meeting are viewing that screen. Using the techniques disclosed herein, the monitor of the assistant can track a cursor of the user sharing the screen. This allows the person viewing the assistant to see details such as a code change while also having a view of their assistant near those details.

Figure 5B:
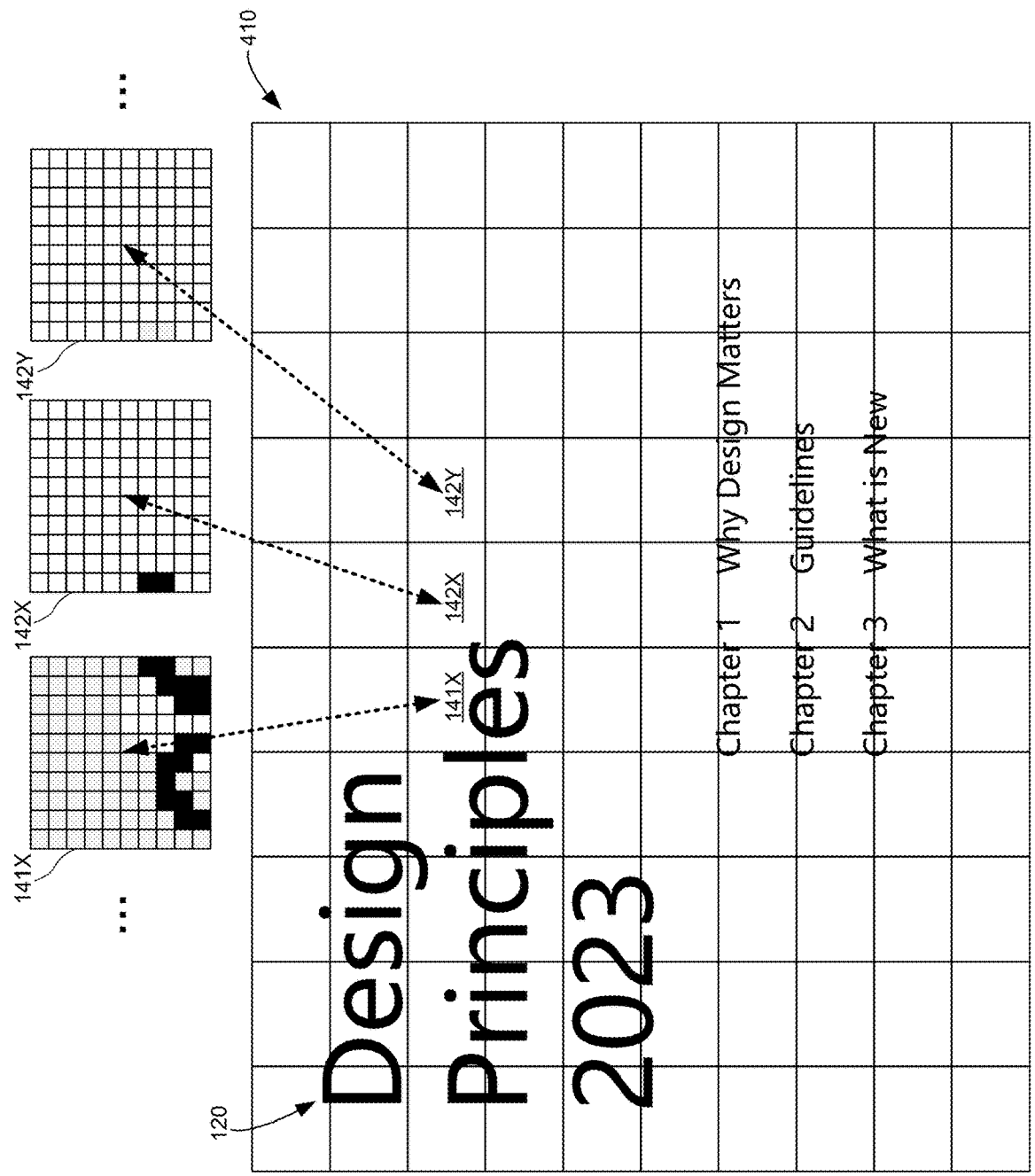
FIG. 5B shows how a rendering of shared content can be analyzed to determine regions for displaying a video of an assistant.
Figure 5C:
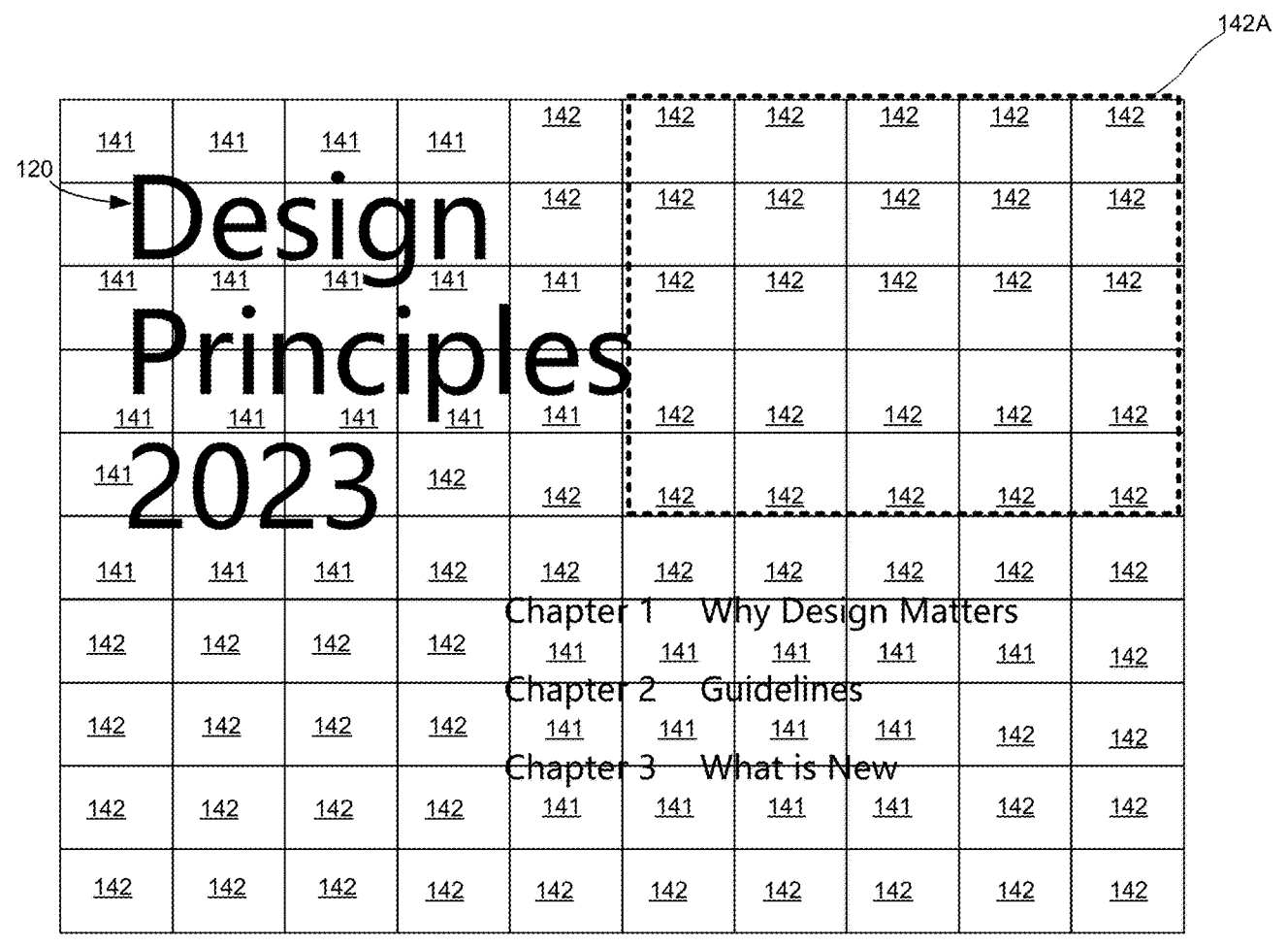

The analysis of a rendering to identify available regions and unavailable regions can include any suitable technique. One illustrative example is shown in FIGS. 5A through 5C. As shown in FIG. 5A, the system can generate data that defines a pattern 410 of a number of undefined regions 140, such as a grid of undefined regions. In this example, each region of the grid of regions includes undefined regions 140, e.g., regions that are not defined as unavailable regions 141 or available regions 142.

Each undefined region can be a predetermined shape and size or each region can be based on the shape and size of rendered objects, such as characters and pictures of a content file. A region of the pattern 410 can be as small as a single pixel, which enables a pixel-by-pixel analysis, or each undefined region can include a larger predetermined area, e.g., a portion of a primary stage, or a portion of a secondary stage, etc.

The system can then analyze the undefined regions 140 to determine if each undefined region contains a threshold level of content. In one illustrative example, the system can analyze each region to determine a number of pixels that are used to display content and a number of pixels that are not used to display content, e.g., pixels used to display a background. Contrast thresholds can be used to determine a difference in color, brightness, or in other display properties to distinguish pixels used to display content and pixels used to display a background. If the ratio of pixels that are used to display content versus a number of pixels that are not used to display content exceeds a threshold ratio within a particular region, the system determines that the particular region contains a threshold level of content.

FIG. 5B shows an example where three regions are analyzed. For instance, an unavailable region 141X is selected given that, with an example threshold ratio of 0.10, that region comprises sixteen pixels that are used to display content versus eighty-four pixels that are not used to display content, or 16 of 100 pixels (ratio of 0.16) that are used to display content. Thus, this region is an unavailable region 141X given that the 16 pixels exceeds a threshold level of content. With the same example threshold ratio of 0.10, the system would also identify a first available region 142X and a second available region 142Y since those regions have two (ratio of 0.02) and zero pixels (ratio of 0.00) that are used to display content, respectively. Thus, these regions do not have a threshold level of content. The other undefined regions of the pattern of regions 410 can be analyzed in a similar manner, results of which are shown in FIG. 5C. Where each of the undefined regions 140 of FIG. 5A are designated as unavailable regions 141 or available regions 142, as shown in FIG. 5C. Although these examples use the same thresholds for determining a threshold level of content for each region, it can be appreciated that different threshold levels can be used. For example, a first threshold can be used to examine a first set of regions, and a second threshold can be used to examine a second set of regions, wherein the first threshold and the second threshold are different.

In some embodiments, the system may display the rendering 151A of the assistant 10A in one of the available regions 142. However, as shown in FIG. 5C, if any one of the available regions 142 is not appropriately sized to fit the rendering 151A of the assistant 10A that is associated with a threshold minimum size of the rendering 151A, the system can cluster available regions 142 to define a larger available region 142A. The rendering 151A of the assistant 10A can be placed in the larger available region 142A or any other region that has dimension that correspond with a threshold minimum size of the rendering 151A.

Figure 6:
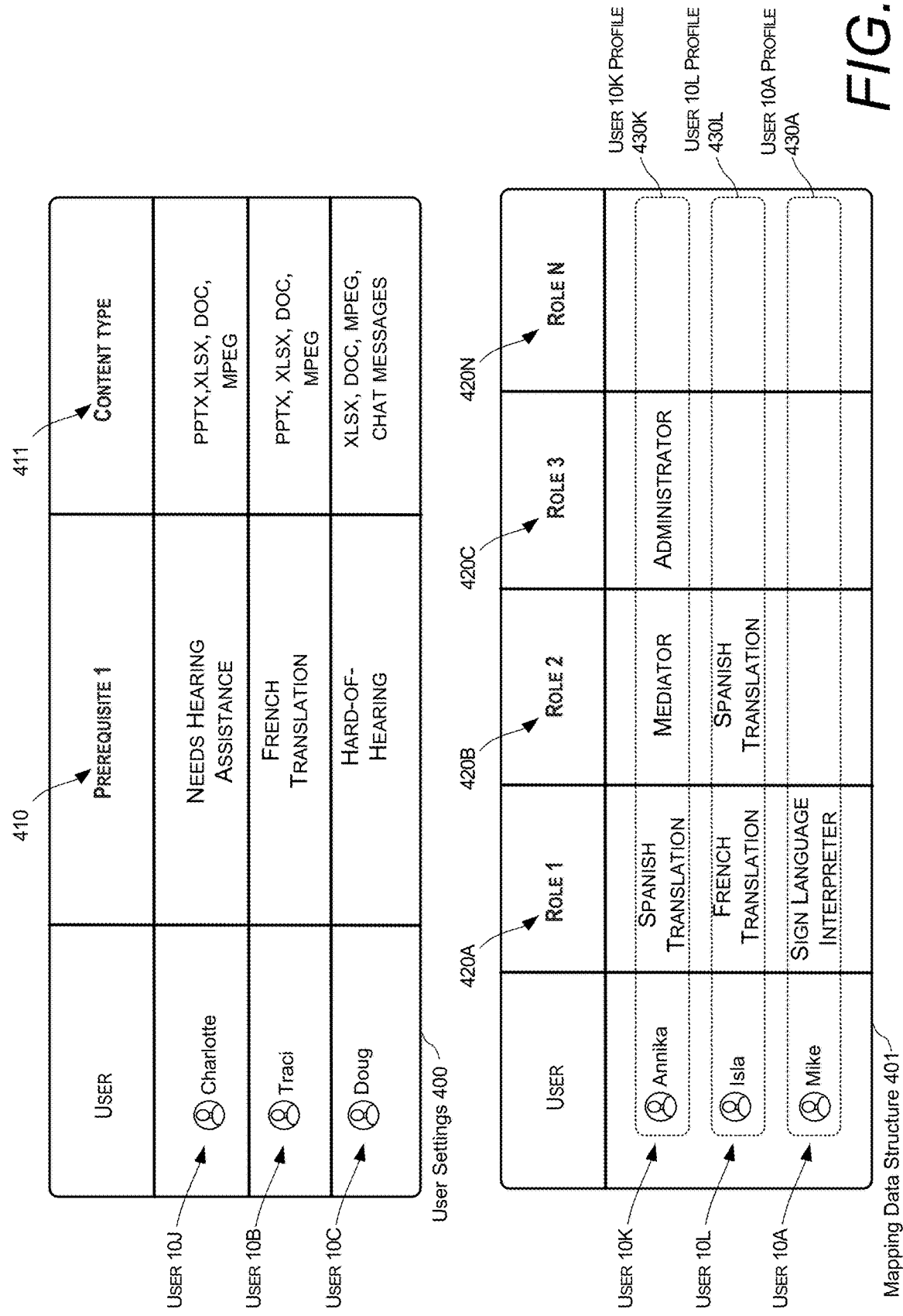
FIG. 6 shows an example of user settings and a mapping data structure.

In some embodiments, system can maintain user settings that persist across meetings. This persistence can be achieved by storing user settings that associate prerequisites with one or more user identities for individual users. FIG. 6 shows an example of user settings 400 and a mapping data structure 401. In general, the user settings can define prerequisites for certain users. For instance, User J has a prerequisite that indicates they are in need of hearing assistance, User B has a prerequisite that indicates they are in need of a French translator, and User C has a first prerequisite that indicates they are in need of hearing assistance, e.g., listed that they are hard-of-hearing. Each user can have a number of assistants. For instance, some users can indicate they are in need of two sign language interpreters.

Each user can be associated with Content Types 411 as well. For instance, User J can have preferences that indicate an association with data types such as: PPTX, XLSX, DOC and MPEG. Thus, when a user shares content having these data types, the system can invoke the content tracking mode based on these settings. The content types 411 can also be referred to herein as "data types" "content data formats" or "content data types." The content types 411 refer to a distinct package of data use for displaying content to a display screen and/or a format for that display. For instance, an instant message delivered in a chat thread is one content data format or one content data type, and a power point file used to display a slide deck on a presentation window is another content data format or another content data type. The other users have other content types that can be used to invoke the content tracking mode. The normal operating mode, which can involve the automatic selection of an assistant, can be invoked in response to determining that the assistant, such as User A, has a role that corresponds to a prerequisite of another user attending the meeting, e.g., connected to the communication session.

The mapping data structure of 401 can define a number of profiles 430. Each profile can identify roles for each user. For instance, User K can be automatically selected as an assistant for users having a prerequisite indicating need for a Spanish translator, a mediator or an administrator; User L can be automatically selected as an assistant for users having a prerequisite indicating need for a French translator or a Spanish translator; and User A can be automatically selected as an assistant for users having a prerequisite indicating need for a sign language interpreter.

The settings 400 are stored in a manner that allows the system 100 to access the settings each time a user joins a meeting. When a meeting participant, such as User J, joins a meeting, the system accesses the user settings and determines if one of the prerequisites 410A associated with the meeting participant, User 10J, corresponds to a role 410A of another user, such as User A. When the role of a particular user is determined to correspond with a prerequisite of the meeting attendee, the system selects that particular user as an assistant to the meeting attendee. The system then persistently displays a rendering of the assistant in a user interface as described herein.

The settings 400 can also be referred to herein as "accessibility setting." The accessibility settings can be any data structure, document, or other form of data that defines a person's needs and associates those needs with their identity. For example, a profile or registration data at the operating system level or application level can indicate that a user has drivers and equipment for a particular accessibility need. That data can be used to indicate a prerequisite that a person is hard-of-hearing, etc. In another example, emails or communication data indicating a person's accessibility needs can also be utilized to indicate a prerequisite of a user and invoke the operations disclosed herein. If a use has specific applications installed on their phone, e.g., a sign language application, such data can also be used to prerequisite of a user and invoke the operations disclosed herein. The settings 400 can be at any stack or level, such as OS, user profile, application level, etc.

In some embodiments, the system may limit the number of assistants for a particular user. For instance, the system may limit User J to only two assistants. This limitation allows the system to provided intelligible display of each assistant, as a large number of assistants may cause the display of smaller renderings which may be difficult to see.

Figure 7:
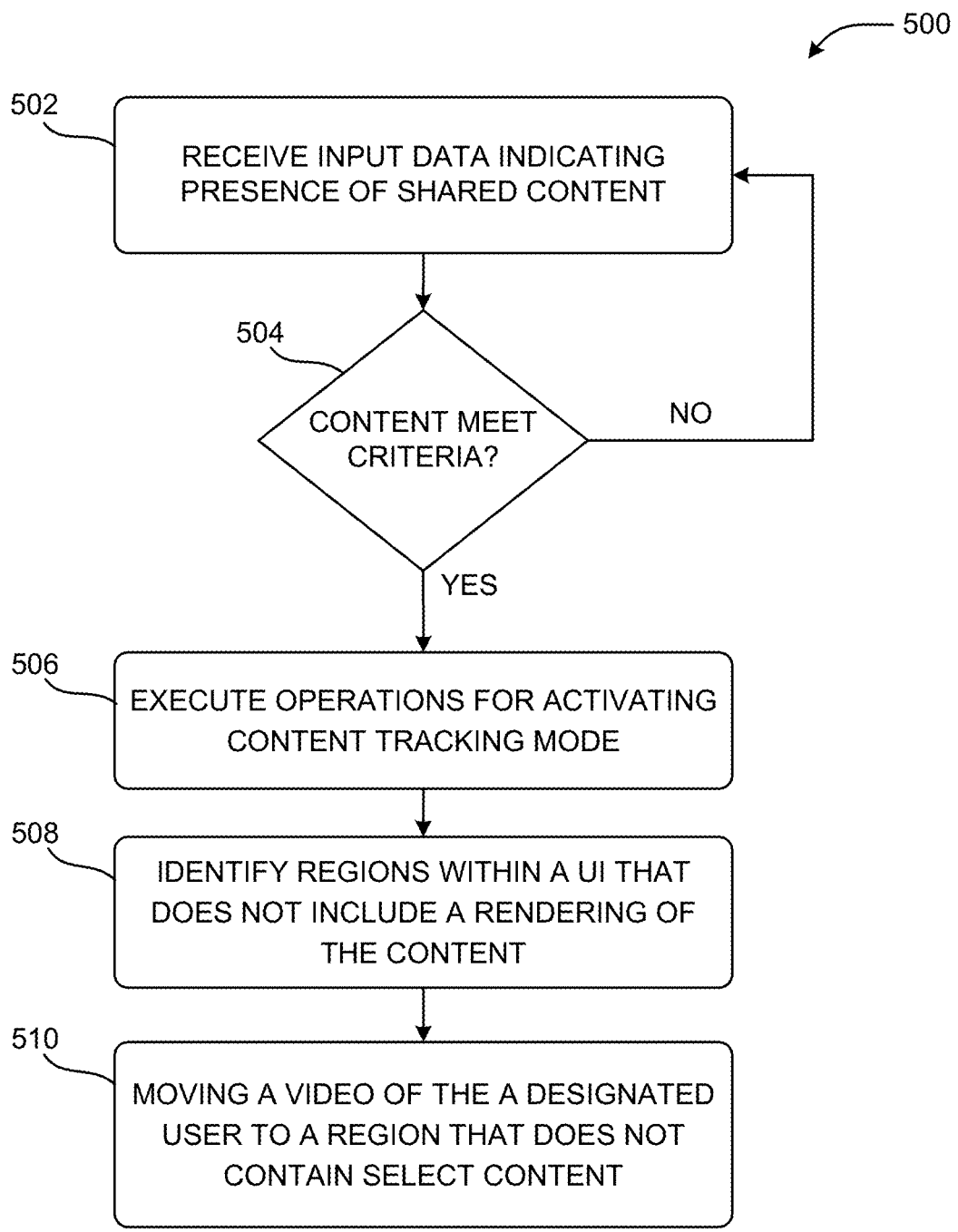
FIG. 7 is a flow diagram showing aspects of a routine for utilizing the disclosed techniques.

FIG. 7 is a diagram illustrating aspects of a routine 500 for providing persistent participant prioritization across communication sessions. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 5 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

In operation 502, the system can receive an input invoking a state change from the normal operating mode to the content tracking mode. The input can identify the shared content 120 having a data type. The shared content can include a file such as a slide deck, a word file, a video, etc. The input invoking a state change can be an input from the viewing user, User J, or the input invoking a state change can be from an input to share content from a presenter, such as User B, or the system can identify the content type of the shared content and determine if that meets a criteria, then automatically invoke the state change. For example, User J can provide an input, such as a voice input, a touch command, a menu selection or any other type of input to invoke the state change from the normal operating mode to the content tracking mode. In another example, the a presenter, such as User B wanting to share a screen or share content in the main stage can provide the input invoking the state change from the normal operating mode to the content tracking mode by just sharing the screen or by sharing a file or a view of a file.

This input can be received while the system is operating in normal operating mode. During normal operating mode, the system displays a first user interface arrangement 101A that includes a rendering 151A of the video stream of a select participant 10A. The rendering 151A of the video stream of the select participant 10A located in a predetermined position while the system 100 is in the normal operating mode. The rendering 151A of the assistant includes a video image of a user, e.g., User 10A, that has a role that is determined to correspond to a prerequisite of a participant in need of assistance, e.g., User J. For instance, the system can provide a persistent display of User A, as an assistant for User J in response to determining that User A has a role, e.g., a sign language interpreter, that corresponds to a prerequisite of User J, e.g., User J has a prerequisite indicating a need for a sign language interpreter. During normal operating mode, the display of the rendering 151A of the video stream of a select participant 10A is not moved or positioned relative to any displayed content.

During operation 502, the system may access a data structure 400 defining preferences for controlling the location of the rendering of the video stream of the select participant 10A when a content tracking mode is activated. The preferences can identify one or more content data types 411 for causing the activation of the content tracking mode. The activation of the content tracking mode causes the system to control the location of the rendering of the video stream of the select participant 10A relative to a display of the shared content, when the shared content meets one or more criteria with respect to one or more data types 411. The one or more data types 411 may be designated in a profile of a meeting participant or in a system preference file.

In response to the input, the routine proceeds to operation 504 where the system determines if the content identified in the input meets one or more criteria. The one or more criteria can be defined in the user profile or in other system preferences. For instance, as shown in the user settings of FIG. 5, if an input provided by user B includes a PPTX, and one or more preferences of the attendees, including the preferences of User J, includes a PPTX data type, the routine can continue to operation 506. However, if the input provided by user B includes a chat message, and since a chat message does not match a data type indicated in a user profile or in other system preferences, the routine would return back to operation 502 where the system would wait for another input.

At operation 506, the system can execute operations and transition to the content tracking mode. While in content tracking mode, the system changes permissions for each client computer from a mode of operation where the renderings of assistants are locked in a position, to another mode where the renderings of assistants are permitted to move to different locations within a user interface relative to a display of shared content.

At operation 508, in response to the input invoking the state change from the normal operating mode to the content tracking mode, the system can analyze a rendering of the shared content 120 to identify a first set of regions 141 of that include the shared content 120 and a second set of regions that do not include the shared content 120. The rendering does not have to be displayed on a device prior to the identification and a selection of a display region. The renderings can start in memory for analysis. A selected region can be determined using a number of methods for identifying the location of displayed content.

At operation 510, the system can cause a display of a second user interface arrangement 101B while in the system is in the content tracking mode. The second user interface arrangement 101B can include the rendering 151A of the video stream of the select participant 10A positioned relative to a region 142A of the second set of regions 142 that do not include the shared content 120. The second user interface arrangement 101B can also display the shared content in the first set of regions 141. In some configurations, the display of the second user interface arrangement 101B having the select participant 10A is only displayed on computers of users in need of an assistant. A user in need of an assistant is defined herein as a user having a prerequisite, wherein that prerequisite corresponds to a role of an assistant. Computers of users who do not have a prerequisite that corresponds to a role of an assistant do not invoke the tracking mode, and thus those computers do not display of the second user interface arrangement 101B having the select participant 10A.

The following clauses are a supplement to the disclosure of the operations described above and shown in FIG. 7. Each of the clauses include features that can be specifically combined with any other clause. For example, clauses depending on Clause A, can be interpreted as depending on other clauses, such as Clause I.

Clause A: A computer-implemented method for controlling a location of a rendering (151A) of a video stream of a select participant (10A) of a communication session (603) during a display of shared content (120), the method for execution on a system (100), the method comprising: accessing a data structure (400) defining preferences for controlling the location of the rendering of the video stream of the select participant (10A) when a content tracking mode is activated, the preferences identifying one or more content data types (411) for causing the activation of the content tracking mode, wherein activation of the content tracking mode causes the system to control the location of the rendering of the video stream of the select participant (10A) to minimize overlap between the rendering of the video stream of the select participant (10A) and a rendering of the shared content (120) having the one or more content data types (411); For example, FIG. 5 according to a shared content type and a user setting (such as "needing hearing assistance", the system adaptively places a specific attendee's video based on the attendee's role (such as "sign language interpreter"); causing a display of a first user interface arrangement (101A) while in the system is in a normal operating mode, the first user interface arrangement (101A) comprising the rendering (151A) of the video stream of the select participant (10A), the rendering (151A) of the video stream of the select participant (10A) located in a predetermined position while the system (100) is in the normal operating mode; FIG. 1A shows a system that starts in normal operating mode, the video rendering of the assistant is static within a UI; receiving an input invoking a state change from the normal operating mode to the content tracking mode, wherein the input identifies the shared content (120) having the one or more content data types (411) for display to one or more client devices (11) of participants (10) of the communication session (603); FIG. 1B shows that a user input or system control indicating a content share of a specific data type for activating the tracking mode; in response to the input invoking the state change from the normal operating mode to the content tracking mode based on the shared content (120) having the one or more content data types (411), analyzing a rendering of the shared content (120) to identify a first set of regions (141) of that display a threshold level of the shared content (120) and a second set of regions (142) that do not display the threshold level of shared content (120); FIG. 1C shows that an analysis of the shared content identifies regions that include content and regions that do not contain content; and causing a display of a second user interface arrangement (101B) while in the system is in the content tracking mode, second user interface arrangement (101B) comprising the rendering (151A) of the video stream of the select participant (10A) positioned in a region (142A) of the second set of regions (142) that do not include the threshold level of shared content (120), wherein the video stream of the select participant (10A) is concurrently displayed with the shared content (120) that is positioned within the first set of regions (141); FIG. 1D shows the positioning the video rendering of the assistant in a region that does not contain the content.

Clause B: The method of the other Clauses, further comprising: accessing settings (400) that persist across multiple communication sessions for a user (10J), the settings define individual prerequisites (410) for the user (10J), the access to the settings is automatically performed by the system without user input, where the access to the settings and a selection of at least one select user (10A) having a role (420A) that corresponds to at least one prerequisite (410A) of the user (10J) is performed automatically by the system (100) in response to the user (10J) joining a communication session; and analyzing a data structure (401) that relates individual users (10A 10K 10L) with one or more roles (420), wherein the analysis of the data structure identifies one or more user profiles (430A) of the at least one select user (10A) having the role (420A) that corresponds to the at least one prerequisite (410A) of the user (10J), wherein the analysis of the data structure (401) to identify the at least one select user (10A) causes the first user interface arrangement (101A) to include the rendering (151A) of the video stream of the select participant (10A); the user setting determines a match between the role of the participant (e.g., a sign language interpreter) and a prerequisite of the attendee.

Clause C: The method of the other Clauses, further comprising: receiving a control input from a computing device (11J) in communication of a display screen showing the second user interface arrangement (101B), wherein the control input includes coordinates within the second user interface arrangement (101B); and moving the rendering (151A) of the video stream of the select participant (10A) according to the coordinates indicated by the control input, wherein the control input is configured to control the movement of the rendering (151A) of the video stream of the select participant (10A) during the content tracking mode, wherein the control input is restricted from controlling the movement of the rendering (151A) of the video stream of the select participant (10A) during the normal operating mode. FIG. 3 shows how mouse-controlled adjustments to the rendering of the assistant can be made by any user of the communication session.

Clause D: The method of the other Clauses, further comprising: receiving an update to the shared content (120); in response to receiving the update to the shared content (120), identifying new regions (142E) that do not include the update the shared content (120); and moving the rendering (151A) of the video stream of the select participant (10A) to the new regions (142E) that do not include the update the shared content (120). FIG. 1E shows dynamic movement of the assistant as the content changes.

Clause E: The method of the other Clauses, further comprising: determining that one or more dimensions of a region (142E) from second set of regions (142) that do not include the shared content (120) is less than a threshold dimension for the rendering (151A) of the video stream of the select participant (10A); in response to determining that one or more dimensions of a region (142E) from second set of regions (142) that do not include the threshold level of shared content (120) is less than the threshold dimension for the rendering (151A) of the video stream of the select participant (10A), reducing at least one dimension of the rendering (151A) of the video stream of the select participant (10A) to a threshold minimum size while in content tracking mode. FIG. 2 shows resizing the rendering of the assistant during large or full-screen content displays.

Clause F: The method of the other Clauses, further comprising: determining that one or more dimensions of a region (142E) from second set of regions (142) that do not include the shared content (120) is less than a threshold dimension for the rendering (151A) of the video stream of the select participant (10A); in response to determining that one or more dimensions of a region (142E) from second set of regions (142) that do not include the threshold level of shared content (120) is less than the threshold dimension for the rendering (151A) of the video stream of the select participant (10A), positioning the rendering (151A) of the video stream of the select participant (10A) to a position to minimize the overlap between displayed aspects of the shared content (120) and the rendering (151A) of the video stream of the select participant (10A). FIG. 2: moving the rendering of the assistant during large or full-screen content displays, e.g., moving to the side or bottom of the content.

Clause G: The method of the other Clauses, wherein normal operating mode causes the system to position the rendering of the video stream in a static location, wherein the rendering (151A) of the video stream of the select participant (10A) is not moved according to the position of the rendering of shared content.

Clause H: The method of the other Clauses, wherein a selection of the shared content having a data type that is not the one or content data types (411) does not invoke the state change from the normal operating mode to the content tracking mode. The tracking mode does not turn on for data types other than the select content data types (411), e.g., tracking mode does not turn on when someone sends an instant message.

Clause I: A computer-implemented method for controlling a location of a rendering (151A) of a video stream of a select participant (10A) of a communication session (603) during a display of shared content (120) shared by a presenter, the method for execution on a system (100), the method comprising: accessing a data structure (400) defining preferences for controlling the location of the rendering of the video stream of the select participant (10A) when a content tracking mode is activated, the data structure identifying one or more content data formats (411) for causing activation of the content tracking mode, wherein activation of the content tracking mode causes the system, during the shared content (120) being shared by the presenter, to control the location of the rendering of the video stream of the select participant (10A) to control the overlap between the rendering of the video stream of the select participant (10A) and a rendering of the shared content (120) having the one or more content data formats (411), wherein the select participant (10A) is different from the presenter sharing the shared content; causing a display of a first user interface arrangement (101A) while the system is in a normal operating mode, the first user interface arrangement (101A) comprising the rendering (151A) of the video stream of the select participant (10A), the rendering (151A) of the video stream of the select participant (10A) located in a predetermined position while the system (100) is in the normal operating mode; receiving an input invoking a state change from the normal operating mode to the content tracking mode; in response to the input invoking the state change from the normal operating mode to the content tracking mode and based on the shared content (120) having the one or more content data formats (411), and based on a role of the select participant (10A) corresponding to a prerequisite of a user (10J): analyzing a rendering of the shared content (120) to identify a first set of regions (141) that display a first threshold level of the shared content (120) and a second set of regions (142) that do not display a second threshold level of shared content (120); and causing a display of a second user interface arrangement (101B) while in the system is in the content tracking mode, the second user interface arrangement (101B) comprising the rendering (151A) of the video stream of the select participant (10A) positioned in a region (142A) of the second set of regions (142) that do not include the second threshold level of shared content (120), wherein the video stream of the select participant (10A) is concurrently displayed with the shared content (120) that is positioned within the first set of regions (141).

Clause J: The method of the other Clauses, further comprising: accessing settings (400) that persist across multiple communication sessions for a user (10J), wherein the settings define individual prerequisites (410) for the user (10J), the access to the settings is automatically performed by the system without user input; selecting at least one select user (10A) having a role (420A) that corresponds to at least one prerequisite (410A) of the user (10J) is performed automatically by the system (100) in response to the user (10J) joining a communication session; analyzing a data structure (401) that relates individual users (10A 10K 10L) with one or more roles (420); and identifying one or more user profiles (430A) of the at least one select user (10A) having the role (420A) that corresponds to the at least one prerequisite (410A) of the user (10J), wherein the identification of the at least one select user (10A) causes the second user interface arrangement (101B) to include the rendering (151A) of the video stream of the select participant (10A), wherein the select participant is not displayed on computing devices of users that are not associated with prerequisites that correspond with the one or more roles of the individual users.

Clause K: The method of the other Clauses, further comprising: receiving a control input from a computing device (11J) in communication of a display screen showing the second user interface arrangement (101B), wherein the control input includes coordinates within the second user interface arrangement (101B); and moving the rendering (151A) of the video stream of the select participant (10A) according to the coordinates indicated by the control input, wherein the control input is configured to control the movement of the rendering (151A) of the video stream of the select participant (10A) during the content tracking mode, wherein the control input is restricted from controlling the movement of the rendering (151A) of the video stream of the select participant (10A) during the normal operating mode.

Clause L: The method of the other Clauses, further comprising: receiving an update to the shared content (120); in response to receiving the update to the shared content (120), identifying new regions (142E) that do not include the update the shared content (120); and moving the rendering (151A) of the video stream of the select participant (10A) to the new regions (142E) that do not include the update the shared content (120).

Clause M: The method of the other Clauses, further comprising: determining that one or more dimensions of a region (142E) from second set of regions (142) that do not include the shared content (120) is less than a threshold dimension for the rendering (151A) of the video stream of the select participant (10A); in response to determining that one or more dimensions of a region (142E) from second set of regions (142) that do not include the second threshold level of shared content (120) is less than the threshold dimension for the rendering (151A) of the video stream of the select participant (10A), reducing at least one dimension of the rendering (151A) of the video stream of the select participant (10A) to a threshold minimum size while in content tracking mode.

Clause N: The method of the other Clauses, further comprising: determining that one or more dimensions of a region (142E) from second set of regions (142) that do not include the shared content (120) is less than a threshold dimension for the rendering (151A) of the video stream of the select participant (10A); in response to determining that one or more dimensions of a region (142E) from second set of regions (142) that do not include the second threshold level of shared content (120) is less than the threshold dimension for the rendering (151A) of the video stream of the select participant (10A), positioning the rendering (151A) of the video stream of the select participant (10A) to a position to minimize the overlap between displayed aspects of the shared content (120) and the rendering (151A) of the video stream of the select participant (10A).

Clause O: The method of the other Clauses, wherein the input identifies the shared content (120) having the one or more content data types (411) for display to one or more client devices (11) of participants (10) of the communication session (603), the input is received from a computing device associated with the presenter.

Clause P: The method of the other Clauses, wherein the input invoking the state change from the normal operating mode to the content tracking mode is received from a computing device associated with the user.

Figure 8:
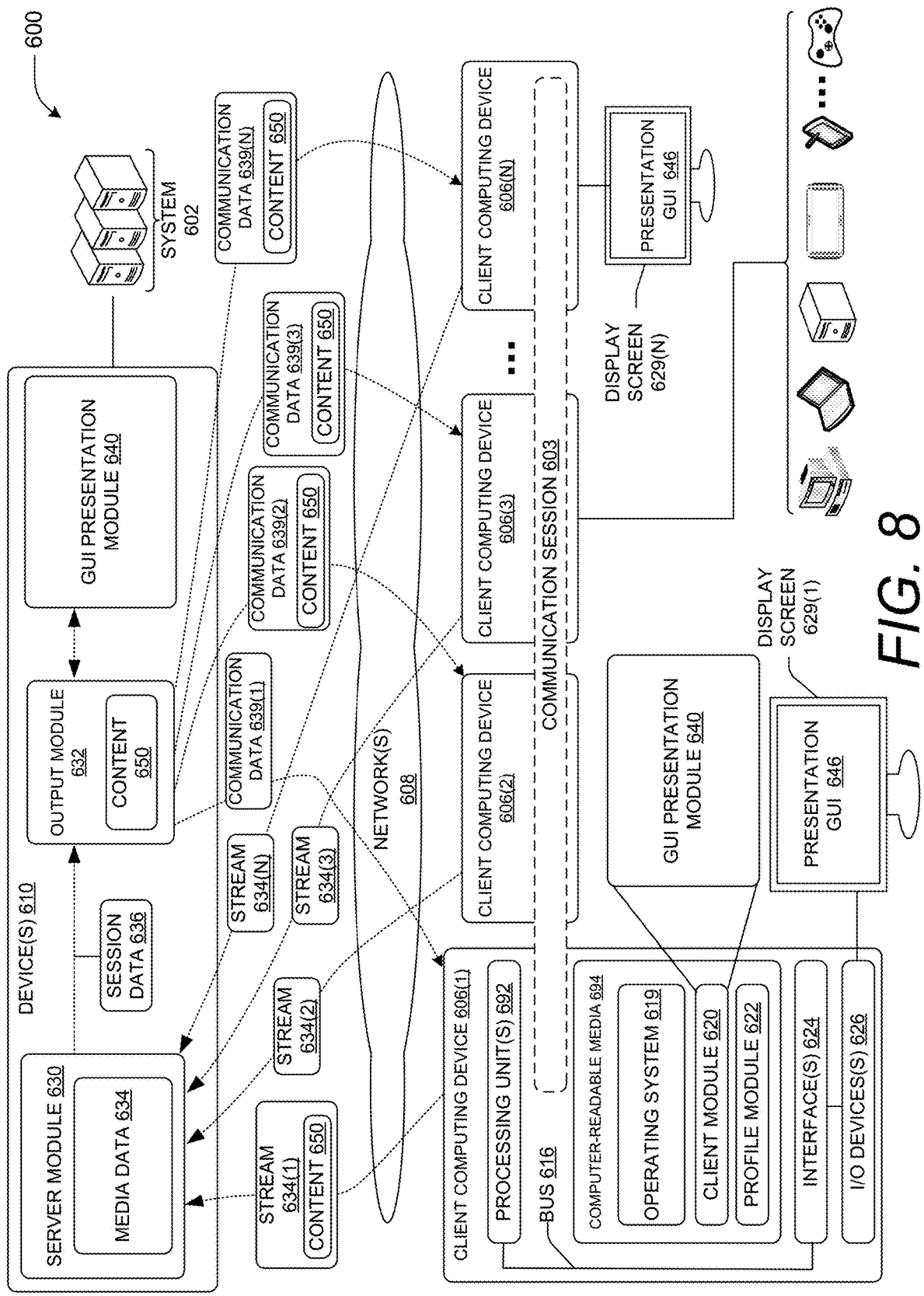
FIG. 8 is a computer architecture diagram illustrating an illustrative computer hardware and software architecture for a computing system capable of implementing aspects of the techniques and technologies presented herein.

FIG. 8 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 9:
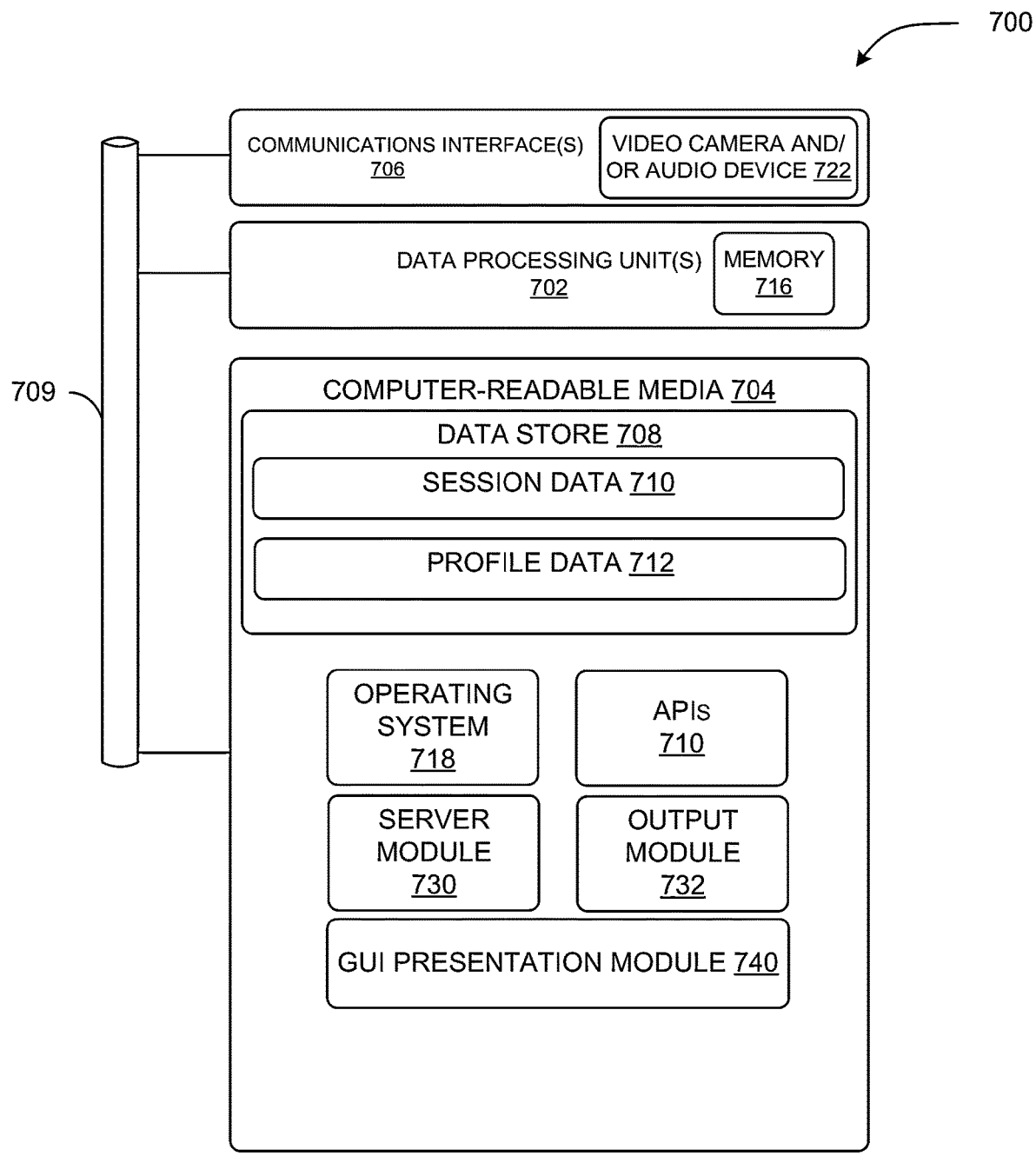
FIG. 9 is a computer architecture diagram illustrating a computing device architecture for a computing device capable of implementing aspects of the techniques and technologies presented herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. Hardware data 711 can define aspects of any device, such as a number of display screens of a computer. The session data can also define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for controlling a location of a rendering of a video stream of a select participant of a communication session during a display of shared content shared by a presenter, the method for execution on a system, the method comprising:
    accessing a data structure defining preferences for controlling the location of the rendering of the video stream of the select participant when a content tracking mode is activated, the data structure identifying one or more content data formats for causing activation of the content tracking mode;
    causing a display of a first user interface arrangement while the system is in a normal operating mode, the first user interface arrangement comprising the rendering of the video stream of the select participant, the rendering of the video stream of the select participant located in a predetermined position while the system is in the normal operating mode;
    receiving an input invoking a state change from the normal operating mode to the content tracking mode;
    in response to the input for invoking the state change from the normal operating mode to the content tracking mode:
        determining that a role of the select participant corresponds to a prerequisite of a user;
        determining that the shared content includes the one or more content data formats;
        in response to determining that the role of the select participant corresponds to the prerequisite of the user and determining that the shared content includes the one or more content data formats:
            analyzing a rendering of the shared content to identify a first set of regions that display a first threshold level of the shared content and a second set of regions that do not display a second threshold level of shared content; and
            causing a display of a second user interface arrangement while in the system is in the content tracking mode, the second user interface arrangement comprising the rendering of the video stream of the select participant positioned in a region of the second set of regions that do not include the second threshold level of shared content, wherein the video stream of the select participant is concurrently displayed with the shared content that is positioned within the first set of regions, and during the content tracking mode, controlling the location of the rendering of the video stream of the select participant to reduce overlap between the rendering of the video stream of the select participant and the rendering of the shared content having the one or more content data formats, wherein the select participant is different from the presenter sharing the shared content.

2. The method of claim 1, further comprising:
    accessing settings that persist across multiple communication sessions for a user, wherein the settings define individual prerequisites for the user, the access to the settings is automatically performed by the system without user input;
    selecting at least one select user having a role that corresponds to at least one prerequisite of the user is performed automatically by the system in response to the user joining a communication session;
    analyzing a data structure that relates individual users with one or more roles; and
    identifying one or more user profiles of the at least one select user having the role that corresponds to the at least one prerequisite of the user, wherein the identification of the at least one select user causes the second user interface arrangement to include the rendering of the video stream of the select participant, wherein the select participant is restricted from being displayed on computing devices of users that are not associated with prerequisites that correspond with the one or more roles of the individual users.

3. The method of claim 1, further comprising:
    receiving a control input from a computing device in communication of a display screen showing the second user interface arrangement, wherein the control input includes coordinates within the second user interface arrangement; and
    moving the rendering of the video stream of the select participant according to the coordinates indicated by the control input, wherein the control input is configured to control the movement of the rendering of the video stream of the select participant during the content tracking mode.

4. The method of claim 1, further comprising:
    receiving an update to the shared content;
    in response to receiving the update to the shared content, identifying new regions that do not include the update the shared content; and
    moving the rendering of the video stream of the select participant to the new regions that do not include the update the shared content.

5. The method of claim 1, further comprising:
determining that one or more dimensions of a region from second set of regions that do not include the shared content is less than a threshold dimension for the rendering of the video stream of the select participant;
in response to determining that one or more dimensions of a region from second set of regions that do not include the second threshold level of shared content is less than the threshold dimension for the rendering of the video stream of the select participant, reducing at least one dimension of the rendering of the video stream of the select participant to a threshold minimum size while in content tracking mode.

6. The method of claim 1, further comprising:
determining that one or more dimensions of a region from second set of regions that do not include the shared content is less than a threshold dimension for the rendering of the video stream of the select participant;
in response to determining that one or more dimensions of a region from second set of regions that do not include the second threshold level of shared content is less than the threshold dimension for the rendering of the video stream of the select participant, positioning the rendering of the video stream of the select participant to a position to minimize the overlap between displayed aspects of the shared content and the rendering of the video stream of the select participant.

7. The method of claim 1, wherein the one or more content data formats that enable the invocation of the content tracking mode includes at least one of a presentation file format or a file format comprising text, wherein the one or more content data formats that enable the invocation of the content tracking mode does not include a video stream format.

8. The method of claim 1, wherein the content tracking mode is not invoked when the shared content does not include the one or more content data formats.

9. A computing device for controlling a location of a rendering of a video stream of a select participant of a communication session during a display of shared content shared by a presenter, the method for execution on a system, the computing device comprising:
one or more processing units; and
a computer-readable storage medium having encoded thereon computer-executable instructions to cause the one or more processing units to:
access a data structure defining preferences for controlling the location of the rendering of the video stream of the select participant when a content tracking mode is activated, the data structure identifying one or more content data formats for causing activation of the content tracking mode;
cause a display of a first user interface arrangement while the system is in a normal operating mode, the first user interface arrangement comprising the rendering of the video stream of the select participant, the rendering of the video stream of the select participant located in a predetermined position while the system is in the normal operating mode;
receive an input invoking a state change from the normal operating mode to the content tracking mode;
in response to the input for invoking the state change from the normal operating mode to the content tracking mode:
determining that a role of the select participant corresponds to a prerequisite of a user;
determining that the shared content includes the one or more content data formats;
in response to determining that the role of the select participant corresponds to the prerequisite of the user and determining that the shared content includes the one or more content data formats:
analyze a rendering of the shared content to identify a first set of regions that display a first threshold level of the shared content and a second set of regions that do not display a second threshold level of shared content; and
cause a display of a second user interface arrangement while in the system is in the content tracking mode, the second user interface arrangement comprising the rendering of the video stream of the select participant positioned in a region of the second set of regions that do not include the second threshold level of shared content, wherein the video stream of the select participant is concurrently displayed with the shared content that is positioned within the first set of regions, and during the content tracking mode, controlling the location of the rendering of the video stream of the select participant to reduce overlap between the rendering of the video stream of the select participant and the rendering of the shared content having the one or more content data formats, wherein the select participant is different from the presenter sharing the shared content.

10. The computing device of claim 9, wherein the display of the second user interface arrangement displays the shared content in an operating system desktop or an application that is an independently executed application from a communication application managing the communication session, wherein the second user interface arrangement displays the shared content while the user interface of the communication application is minimized, wherein a cursor input provided by a computing device associated with the input that identified the shared content causes movement of the rendering of the video stream of the select participant rendering of the video stream of the select participant.

11. The computing device of claim 9, wherein the instructions further cause the one or more processing units to:
receive a control input from a computing device in communication of a display screen showing the second user interface arrangement, wherein the control input includes coordinates within the second user interface arrangement; and
move the rendering of the video stream of the select participant according to the coordinates indicated by the control input, wherein the control input is configured to control the movement of the rendering of the video stream of the select participant during the content tracking mode, wherein the control input is restricted from controlling the movement of the rendering of the video stream of the select participant during the normal operating mode.

12. The computing device of claim 9, wherein the instructions further cause the one or more processing units to:
receive an update to the shared content;
in response to receiving the update to the shared content, identify new regions that do not include the update the shared content; and
move the rendering of the video stream of the select participant to the new regions that do not include the update the shared content.

13. The computing device of claim 9, wherein the instructions further cause the one or more processing units to:

determine that one or more dimensions of a region from second set of regions that do not include the second threshold level of shared content is less than a threshold dimension for the rendering of the video stream of the select participant;

in response to determining that one or more dimensions of a region from second set of regions that do not include the second threshold level of shared content is less than the threshold dimension for the rendering of the video stream of the select participant, reduce at least one dimension of the rendering of the video stream of the select participant to a threshold minimum size while in content tracking mode.

14. The computing device of claim 9, wherein the instructions further cause the one or more processing units to:

determine that one or more dimensions of a region from second set of regions that do not include the second threshold level of shared content is less than a threshold dimension for the rendering of the video stream of the select participant;

in response to determining that one or more dimensions of a region from second set of regions that do not include the second threshold level of shared content is less than the threshold dimension for the rendering of the video stream of the select participant, position the rendering of the video stream of the select participant to a position to minimize the overlap between displayed aspects of the shared content and the rendering of the video stream of the select participant.

15. A computer-readable storage medium having encoded thereon computer-executable instructions to cause one or more processing units of a system to control a location of a rendering of a video stream of a select participant of a communication session during a display of shared content shared by a presenter, the instructions cause the one or more processing units of the system to:

access a data structure defining preferences for controlling the location of the rendering of the video stream of the select participant when a content tracking mode is activated, the data structure identifying one or more content data formats for causing activation of the content tracking mode;

cause a display of a first user interface arrangement while the system is in a normal operating mode, the first user interface arrangement comprising the rendering of the video stream of the select participant, the rendering of the video stream of the select participant located in a predetermined position while the system is in the normal operating mode;

receive an input invoking a state change from the normal operating mode to the content tracking mode;

in response to the input for invoking the state change from the normal operating mode to the content tracking mode:

determining that a role of the select participant corresponds to a prerequisite of a user;

determining that the shared content includes the one or more content data formats;

in response to determining that the role of the select participant corresponds to the prerequisite of the user and determining that the shared content includes the one or more content data formats:

analyze a rendering of the shared content to identify a first set of regions that display a first threshold level of the shared content and a second set of regions that do not display a second threshold level of shared content; and cause a display of a second user interface arrangement while in the system is in the content tracking mode, the second user interface arrangement comprising the rendering of the video stream of the select participant positioned in a region of the second set of regions that do not include the second threshold level of shared content, wherein the video stream of the select participant is concurrently displayed with the shared content that is positioned within the first set of regions, and during the content tracking mode, controlling the location of the rendering of the video stream of the select participant to reduce overlap between the rendering of the video stream of the select participant and the rendering of the shared content having the one or more content data formats, wherein the select participant is different from the presenter sharing the shared content.

16. The computer-readable storage medium of claim 15, wherein the instructions further cause the one or more processing units to:

access settings that persist across multiple communication sessions for a user, the settings define individual prerequisites for the user, the access to the settings is automatically performed by the system without user input, where the access to the settings and a selection of at least one select user having a role that corresponds to at least one prerequisite of the user is performed automatically by the system in response to the user joining a communication session; and analyze a data structure that relates individual users with one or more roles, wherein the analysis of the data structure identifies one or more user profiles of the at least one select user having the role that corresponds to the at least one prerequisite of the user, wherein the analysis of the data structure to identify the at least one select user causes the second user interface arrangement to include the rendering of the video stream of the select participant.

17. The computer-readable storage medium of claim 15, wherein the instructions further cause the one or more processing units to:

receive a control input from a computing device in communication of a display screen showing the second user interface arrangement, wherein the control input includes coordinates within the second user interface arrangement; and move the rendering of the video stream of the select participant according to the coordinates indicated by the control input, wherein the control input is configured to control the movement of the rendering of the video stream of the select participant during the content tracking mode, wherein the control input is restricted from controlling the movement of the rendering of the video stream of the select participant during the normal operating mode.

18. The computer-readable storage medium of claim 15, wherein the instructions further cause the one or more processing units to:

receive an update to the shared content;

in response to receiving the update to the shared content, identify new regions that do not include the update the shared content; and move the rendering of the video stream of the select participant to the new regions that do not include the update the shared content.

19. The computer-readable storage medium of claim 15, wherein the instructions further cause the one or more processing units to:

determine that one or more dimensions of a region from second set of regions that do not include the second threshold level of shared content is less than a threshold dimension for the rendering of the video stream of the select participant;

in response to determining that one or more dimensions of a region from second set of regions that do not include the second threshold level of shared content is less than the threshold dimension for the rendering of the video stream of the select participant, reduce at least one dimension of the rendering of the video stream of the select participant to a threshold minimum size while in content tracking mode.

20. The computer-readable storage medium of claim 15, wherein the instructions further cause the one or more processing units to:

determine that one or more dimensions of a region from second set of regions that do not include the second threshold level of shared content is less than a threshold dimension for the rendering of the video stream of the select participant;

in response to determining that one or more dimensions of a region from second set of regions that do not include the second threshold level of shared content is less than the threshold dimension for the rendering of the video stream of the select participant, position the rendering of the video stream of the select participant to a position to minimize the overlap between displayed aspects of the shared content and the rendering of the video stream of the select participant.

* * * * *